United States Patent
Jain et al.

(10) Patent No.: US 11,494,241 B2
(45) Date of Patent: Nov. 8, 2022

(54) MULTI-STAGE IOPS ALLOCATION

(71) Applicant: Nutanix, Inc., San Jose, CA (US)

(72) Inventors: Kshitiz Jain, Bangalore (IN); Prateek Kajaria, Bengaluru (IN)

(73) Assignee: Nutanix, Inc., San Jose, CA (US)

( * ) Notice: Subject to any disclaimer, the term of this patent is extended or adjusted under 35 U.S.C. 154(b) by 0 days.

(21) Appl. No.: 17/171,195

(22) Filed: Feb. 9, 2021

(65) Prior Publication Data

US 2021/0232436 A1 Jul. 29, 2021

Related U.S. Application Data

(63) Continuation of application No. 16/177,113, filed on Oct. 31, 2018, now Pat. No. 10,922,142.

(51) Int. Cl.
*G06F 9/455* (2018.01)
*G06F 9/50* (2006.01)

(52) U.S. Cl.
CPC ........ *G06F 9/5077* (2013.01); *G06F 9/45558* (2013.01); *G06F 2009/45579* (2013.01); *G06F 2009/45595* (2013.01)

(58) Field of Classification Search
CPC .............. G06F 9/5077; G06F 9/45558; G06F 2009/45579; G06F 2009/45595
See application file for complete search history.

(56) References Cited

U.S. PATENT DOCUMENTS

| | | |
|---|---|---|
| 6,253,224 B1 | 6/2001 | Brice, Jr. et al. |
| 7,085,883 B1 | 8/2006 | Dalgic et al. |
| 7,877,258 B1 | 1/2011 | Chelba et al. |
| 8,549,518 B1 | 10/2013 | Aron et al. |
| 8,601,473 B1 | 12/2013 | Aron et al. |
| 8,850,130 B1 | 9/2014 | Aron et al. |
| 9,396,202 B1 | 7/2016 | Drobychev et al. |
| 9,448,927 B1 | 9/2016 | Agarwala et al. |
| 9,590,843 B2 | 3/2017 | Cui et al. |
| 9,699,251 B2 | 7/2017 | Cui et al. |
| 9,705,737 B2 | 7/2017 | Wetterwald et al. |
| 9,727,355 B2 | 8/2017 | Holler et al. |
| 9,772,866 B1 | 9/2017 | Aron et al. |

(Continued)

OTHER PUBLICATIONS

U.S. Appl. No. 15/607,278, filed May 26, 2017.

(Continued)

*Primary Examiner* — Gregory A Kessler
(74) *Attorney, Agent, or Firm* — Vista IP Law Group, LLP

(57) ABSTRACT

Systems and methods for policy-based apportionment of input/output operations (IOPS) in computing systems. Embodiments access a policy that specifies IOPS limits. Two or more virtual machines that are associated with the policy and two or more nodes that host those virtual machines are identified. In a first allocation stage, an inter-node policy manager prescribes an initial IOPS limit to the two or more nodes. The allocation amounts sent to the nodes depend at least in part on performance capabilities of respective nodes. In a second allocation stage, for each node that had received a limit amount, that amount is apportioned to the sets of virtual machines that execute on respective host nodes. Each node of the two or more nodes invokes its own node-local IOPS monitoring. Each node reports IOPS usage data to the inter-node policy manager, which in turn adjusts the node-level IOPS apportionments based on the node-level usage.

24 Claims, 15 Drawing Sheets

(56) References Cited

U.S. PATENT DOCUMENTS

| | | |
|---|---|---|
| 9,882,805 B2 | 1/2018 | Thankappan et al. |
| 9,886,443 B1 | 2/2018 | Gupta et al. |
| 9,971,785 B1 | 5/2018 | Byrne et al. |
| 10,069,914 B1 | 9/2018 | Smith |
| 2005/0210193 A1 | 9/2005 | Nagata |
| 2006/0233168 A1 | 10/2006 | Lewites et al. |
| 2009/0271581 A1 | 10/2009 | Hinrichs, Jr. |
| 2010/0169945 A1 | 7/2010 | Kennedy et al. |
| 2010/0228979 A1 | 9/2010 | Kudo |
| 2011/0239213 A1 | 9/2011 | Aswani et al. |
| 2012/0079607 A1 | 3/2012 | Lal et al. |
| 2012/0147894 A1 | 6/2012 | Mulligan et al. |
| 2012/0185580 A1 | 7/2012 | Detert |
| 2012/0185856 A1 | 7/2012 | Ashihara et al. |
| 2013/0227236 A1 | 8/2013 | Flynn et al. |
| 2013/0247038 A1 | 9/2013 | Luo et al. |
| 2013/0329548 A1 | 12/2013 | Nakil et al. |
| 2013/0346470 A1 | 12/2013 | Obstfeld et al. |
| 2013/0346720 A1 | 12/2013 | Colgrove et al. |
| 2014/0081918 A1 | 3/2014 | Srivas et al. |
| 2014/0201379 A1 | 7/2014 | Barzily et al. |
| 2014/0244851 A1 | 8/2014 | Lee |
| 2014/0258595 A1 | 9/2014 | Venkatesha et al. |
| 2014/0331090 A1 | 11/2014 | Mohindra et al. |
| 2015/0012998 A1 | 1/2015 | Nellikar et al. |
| 2015/0127611 A1 | 5/2015 | Westerman et al. |
| 2015/0186043 A1 | 7/2015 | Kesselman et al. |
| 2015/0200808 A1 | 7/2015 | Gourlay et al. |
| 2015/0237140 A1 | 8/2015 | Murphy et al. |
| 2015/0356149 A1 | 12/2015 | Dagli et al. |
| 2016/0085839 A1 | 3/2016 | D'halluin et al. |
| 2016/0098331 A1 | 4/2016 | Banka et al. |
| 2016/0323245 A1 | 11/2016 | Shieh et al. |
| 2016/0350148 A1 | 12/2016 | Kitagawa et al. |
| 2016/0359955 A1 | 12/2016 | Gill et al. |
| 2017/0070505 A1 | 3/2017 | Lindley et al. |
| 2017/0111443 A1 | 4/2017 | Zhou |
| 2017/0180465 A1 | 6/2017 | Yamashima et al. |
| 2017/0220572 A1 | 8/2017 | Ding et al. |
| 2017/0235507 A1 | 8/2017 | Sinha et al. |
| 2017/0364574 A1 | 12/2017 | Sivasubramanian et al. |
| 2018/0150317 A1 | 5/2018 | Kuo et al. |
| 2018/0157674 A1 | 6/2018 | Gupta et al. |
| 2018/0278541 A1 | 9/2018 | Wu et al. |
| 2018/0307522 A1 | 10/2018 | Wu et al. |
| 2020/0026425 A1 | 1/2020 | Memon et al. |
| 2020/0028894 A1 | 1/2020 | Memon et al. |

OTHER PUBLICATIONS

Wikipedia. "iSCSI". Mar. 20, 2016. 11 pages.

Hufferd, J. L., "IP Storage Protocols: iSCSI", Storage Networking Industry Association, Jun. 2011, 46 pages.

Cano, I. et al., "Curator: Self-Managing Storage for Enterprise Clusters", *14th USENIX Symposium on Networked Systems Design and Implementation*, NSDI '17, (Mar. 27, 2017).

Poitras, Steven. "The Nutanix Bible" (Oct. 15, 2013), from http://stevenpoitras.com/the-nutanix-bible/ (Publication date based on indicated capture date by Archive.org; first publication date unknown).

Poitras, Steven. "The Nutanix Bible" (Jan. 11, 2014), from http://stevenpoitras.com/the-nutanix-bible/ (Publication date based on indicated capture date by Archive.org; first publication date unknown).

Poitras, Steven. "The Nutanix Bible" (Jun. 20, 2014), from http://stevenpoitras.com/the-nutanix-bible/ (Publication date based on indicated capture date by Archive.org; first publication date unknown).

Poitras, Steven. "The Nutanix Bible" (Jan. 7, 2015), from http://stevenpoitras.com/the-nutanix-bible/ (Publication date based on indicated capture date by Archive.org; first publication date unknown).

Poitras, Steven. "The Nutanix Bible" (Jun. 9, 2015), from http://stevenpoitras.com/the-nutanix-bible/ (Publication date based on indicated capture date by Archive.org; first publication date unknown).

Poitras, Steven. "The Nutanix Bible" (Sep. 4, 2015), from https://nutanixbible.com/.

Poitras, Steven. "The Nutanix Bible" (Jan. 12, 2016), from https://nutanixbible.com/.

Poitras, Steven. "TheNutanix Bible" (Jun. 9, 2016), from https://nutanixbible.com/.

Poitras, Steven. "The Nutanix Bible" (Jan. 3, 2017), from https://nutanixbible.com/.

Poitras, Steven. "The Nutanix Bible" (Jun. 8, 2017), from https://nutanixbible.com/.

Poitras, Steven. "The Nutanix Bible" (Jan. 3, 2018), from https://nutanixbible.com/.

Poitras, Steven. "The Nutanix Bible" (Jun. 25, 2018), from https://nutanixbible.com/.

Poitras, Steven. "The Nutanix Bible" (Jan. 8, 2019), from https://nutanixbible.com/.

EBS I/O Characteristics. "I/O Characteristics and Monitoring", from Amazon EBS: Designing for Performance.

Amazon API Gateway. "Throttle API Requests for Better Throughput", from https://docs.aws.amazon.com/apigateway/latest/developerguide/api-gate . . . .

VMWARE. "Managing Storage I/O Resources", from Vsphere Resource Management Guide.

Notice of Allowance dated Jul. 9, 2020 for corresponding U.S. Pat. No. 10,922,142.

Notice of Allowance dated Oct. 15, 2020 for corresponding U.S. Pat. No. 10,922,142.

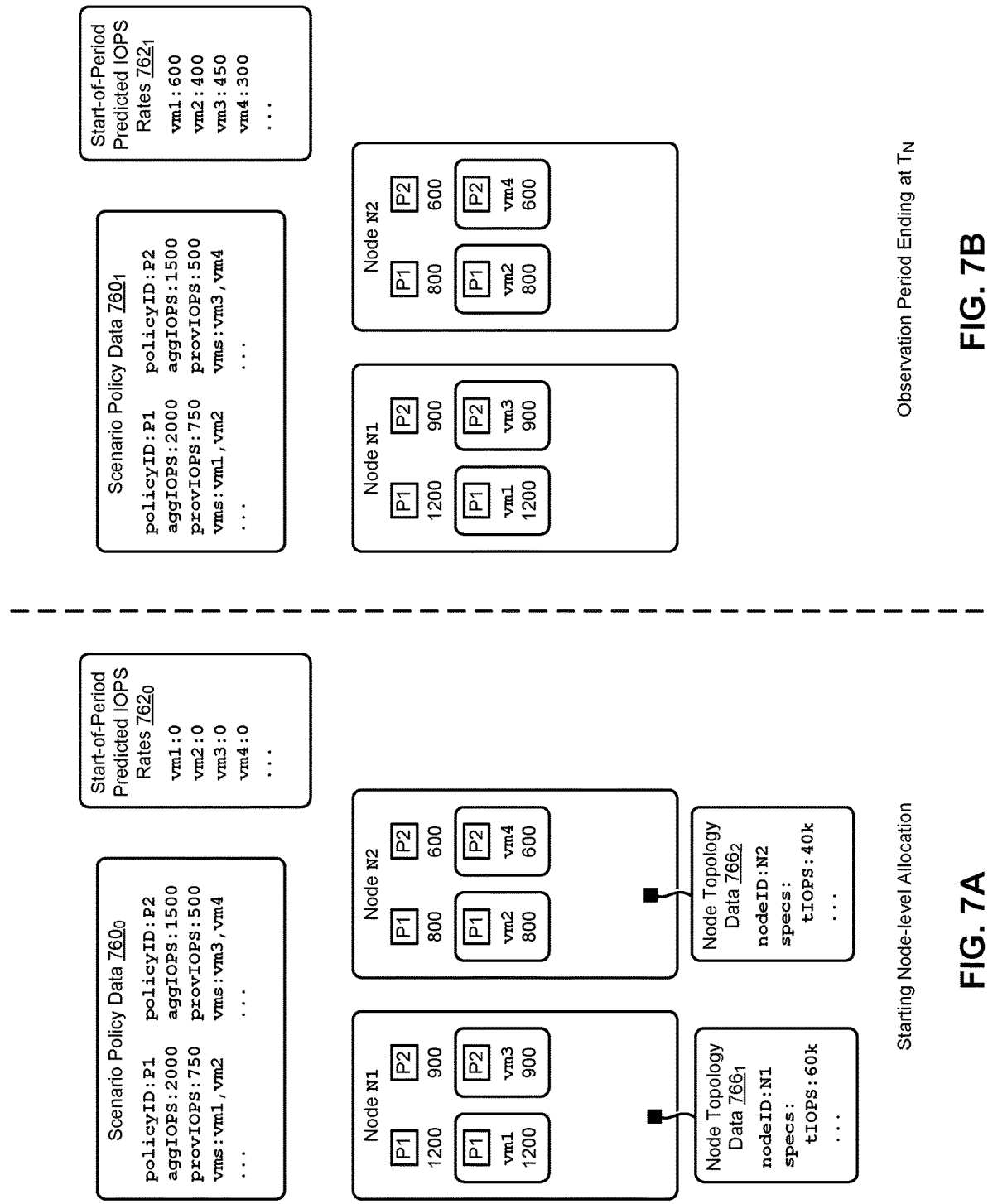

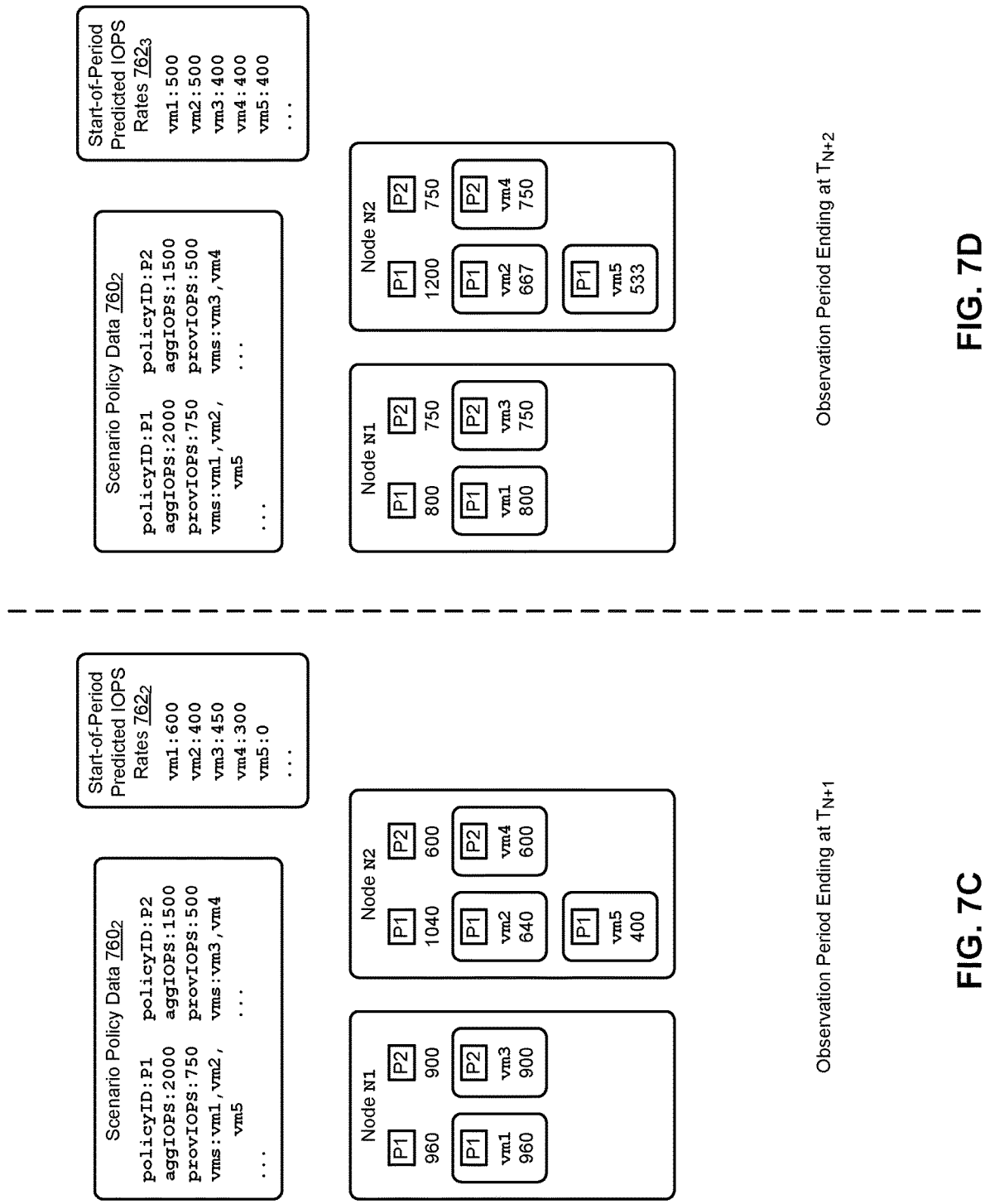

MULTI-STAGE IOPS ALLOCATION

RELATED APPLICATIONS

The present application is a continuation of U.S. patent application Ser. No. 16/177,113 titled "MULTI-STAGE IOPS ALLOCATION", filed Oct. 31, 2018, which is hereby incorporated by reference in its entirety.

FIELD

This disclosure relates to computing systems, and more particularly to techniques for IOPS allocation in virtualization environments.

BACKGROUND

Modern computing systems have evolved to support "virtualization" environments in which the underlying physical computing resources of the system are logically virtualized for flexibility, scaling, and/or other purposes. For example, the physical random-access memory (RAM) of a computing node (e.g., physical server) can be abstracted to one or more sets of "virtual memory" areas. Certain portions of the physical hard disk drives (HDDs) and/or solid-state drives (SSDs) of a computing node might also be abstracted into one or more "virtual disks" (vDisks). Furthermore, multiple "virtual machines" (VMs) can be implemented at a single computing node and operate as autonomous computing entities, each of which might be running respective guest operating systems. Such guest operating systems are virtualized operating systems that abstract the capabilities of the underlying host operating system of the computing node through what is known as a hypervisor.

A virtualization environment associated with a large set of underlying computing resources (e.g., a computing cluster of many computing nodes with large storage facilities) can be shared by multiple tenants. In multi-tenant computing systems, a contractually-limited amount of the computing resources of the multi-tenant computing systems are assigned to individual tenants that may each operate a plurality of virtualized entities. A service level agreement (SLA) often specifies the contractually-limited amount of computing resources as well as other relevant policies. As an example, a plurality of VMs are deployed to the computing nodes of a computing cluster for a particular tenant according to the resource limits set by an SLA.

The contractual agreements and/or limits and/or policies of the SLA place constraints on the computing resources consumed by the VMs of the tenant. One particular policy constraint might limit the average number of input or output (I/O or IO) operations per second (IOPS) over a particular time period. For example, a tenant might have agreed to a subscription level that allows the tenant to consume no more than 5000 IOPS on average over some observation period (e.g., 10 seconds). Compliance with such an IOPS limit is important to the computing system owner since the computing system owner wants to allow other tenants in the virtualization environment to have confidence that the remaining computing resources of the multi-tenant computing system will be available (e.g., for their respective I/O operations processing).

Compliance with such resource usage limits is often administrated through use of an aggregate limit that is applied to the entire collection of VMs of the tenant. Such aggregate limits are applied to the collection of VMs regardless of how many VMs are deployed and/or the nature of the workloads of such VMs. In the case where there are multiple VMs that are subject to an aggregate IOPS limit, then each VM might be individually limited to a fixed apportionment of the aggregate IOPS limit. In this regime, VMs can perform I/O operations in any time period as needed, but only up to their apportioned amount for that time period. As an example, if there are three VMs running under an aggregate policy limitation of 1500 IOPS, each of the three VMs might be apportioned a static maximum of 500 IOPS (e.g., measured as an average over a certain observation period). As such, each VM is "throttled" to consume no more than its statically-apportioned maximum (e.g., average of 500 IOPS per observation period).

Unfortunately, static allocation techniques and throttling against such static allocations can introduce inefficient use of the I/O operations capacity provisioned by a policy. In particular, when the tenant's aggregate IOPS limit is statically apportioned to a group of VMs, and any of the VMs consume less IOPS than their individual allocations for any time period, then the overall quantity of IOPS provisioned to the tenant (e.g., an aggregate IOPS limit) will not be achieved for that time period. Moreover, under delivery of the aggregate IOPS would persist as long as there are any VMs that use less than their individual allocations of the aggregate IOPS limit in any time period. Furthermore, any VMs that require more I/O operations than allowed by their statically-allocated amount in a particular time period are "throttled" back even when there are other VMs that are not fully consuming their own respective IOPS allocations. What is needed is a technological solution for apportioning an aggregate IOPS amount to virtual machines.

SUMMARY

The present disclosure describes techniques used in systems, methods, and in computer program products for multi-stage IOPS allocation, which techniques advance the relevant technologies to address technological issues with legacy approaches. More specifically, the present disclosure describes techniques used in systems, methods, and in computer program products for multi-stage allocation of IOPS limits in virtualization environments. Certain embodiments are directed to technological solutions for implementing a multi-stage allocation mechanism to dynamically apportion policy-based input/output (I/O or IO) limits to virtual machines based on continuous real-time measurements of IO usage.

The herein-disclosed techniques provide technical solutions that address the technical problems attendant to IO starvation of computing processes when other processes have unused allocations of IOPS that could be reapportioned to the starved processes. Such technical solutions relate to improvements in computer functionality. Various applications of the herein-disclosed improvements in computer functionality serve to improve utilization of computer memory, improve utilization of computer processing power, improve utilization of network bandwidth use, and reduce the demand for inter-component communication. Some embodiments disclosed herein use techniques to improve the functioning of multiple systems within the disclosed environments, and some embodiments advance peripheral technical fields as well. As specific examples, use of the disclosed computer equipment, networking equipment, and constituent devices within the shown environments as described herein and as depicted in the figures provide advances in the technical field of computing cluster management as well as advances in various technical fields related to hyperconverged computing platform design and deployment.

Further details of aspects, objectives, and advantages of the technological embodiments are described herein, and in the drawings and claims.

BRIEF DESCRIPTION OF THE DRAWINGS

The drawings described below are for illustration purposes only. The drawings are not intended to limit the scope of the present disclosure.

FIG. 7A, FIG. 7B, FIG. 7C, FIG. 7D, FIG. 7E, and FIG. 7F depict IOPS allocation scenarios as performed in systems that facilitate multi-stage allocations of an IOPS limit in virtualization environments, according to an embodiment.

DETAILED DESCRIPTION

Figure 1A:
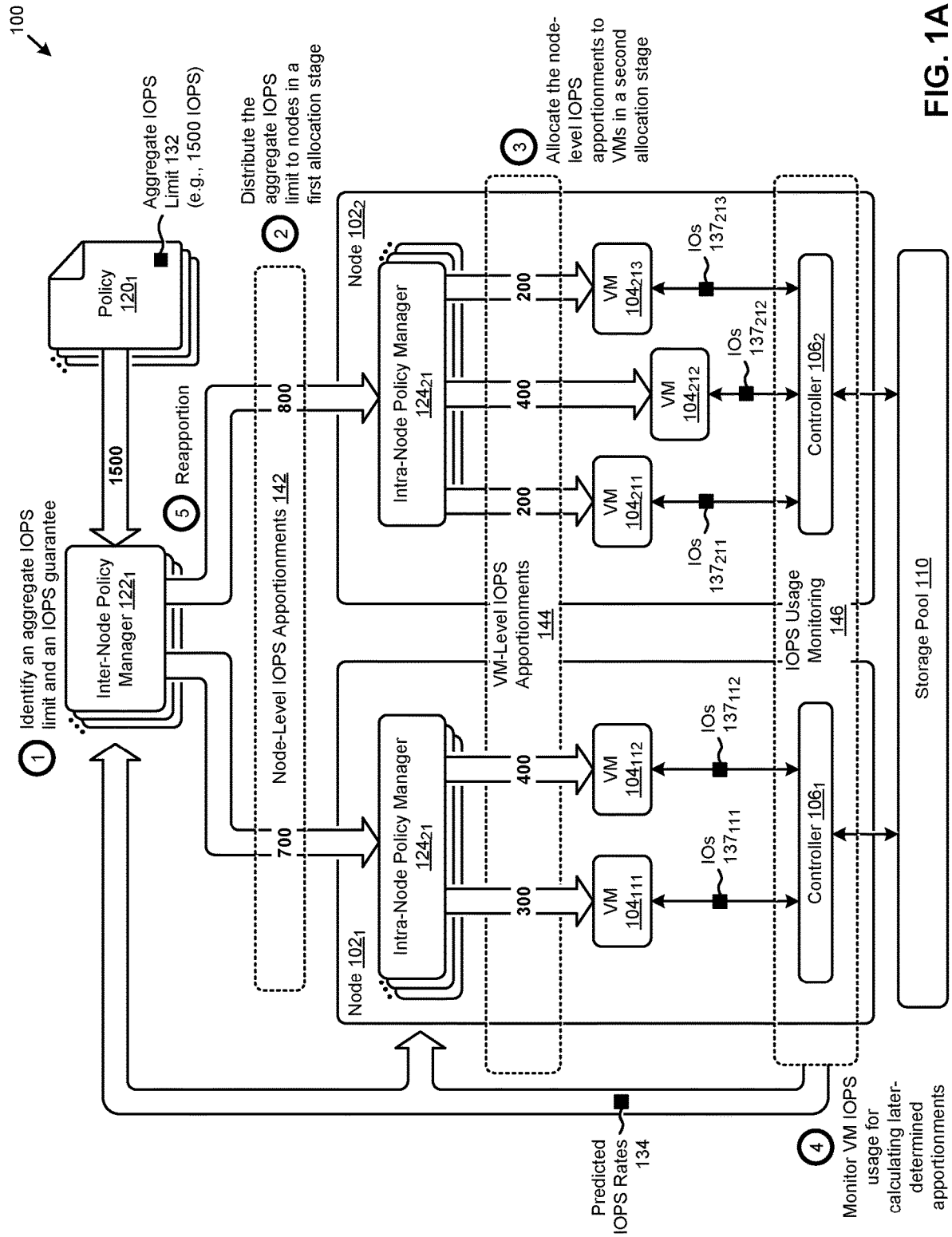
FIG. 1A illustrates a computing environment in which embodiments of the present disclosure can be implemented.

Embodiments in accordance with the present disclosure address the problems that arise from static allocation of IOPS limits across multiple processes. Application of the herein-disclosed techniques avoids starvation of IOPS-hungry processes when other processes have unused allocations of IOPS. Some embodiments are directed to approaches for implementing a multi-stage allocation mechanism to dynamically apportion policy-based IO limits to virtual machines based on continuous real-time measurements of IO usage. The accompanying figures and discussions herein present example environments, systems, methods, and computer program products.

Overview

Disclosed herein are techniques for implementing a multi-stage allocation mechanism to apportion policy-based IOPS limits to virtual machines (VMs) in virtualization environments. The IOPS limits are dynamically apportioned to the VMs based at least in part on measured and predicted IOPS rates of the virtual machines, thereby improving the utilization of the I/O operations provisioned in accordance with a corresponding policy. In certain embodiments, nodes and VMs associated with a particular policy are identified. In many cases, a particular policy corresponds to a particular tenant of a virtualization environment. An instance of an inter-node policy manager apportions the aggregate IOPS limit specified in the policy over the identified nodes in a first allocation stage. As an example, the inter-node policy manager might determine the apportionment of the aggregate IOPS for the nodes based at least in part on the IOPS capabilities of the nodes. In a second allocation stage, instances of intra-node policy managers at each node distribute the respective node-level IOPS apportionments to the VMs at the nodes. The portion of a node-level IOPS apportionment allocated to a particular VM might initially be based at least in part on an amount of initially provisioned IOPS (e.g., a minimum amount of VM IOPS) available at the node of the VM. The actual IOPS usage rates at the VMs are monitored to determine allocation adjustments to be implemented at the node level (e.g., by the inter-node policy manager in the first allocation stage) and/or the VM level (e.g., by the intra-node policy managers in the second allocation stage). The foregoing multi-stage allocation mechanism can accommodate many operational scenarios in the virtualization environment, including VM create/destroy scenarios, VM failures, node failures, and so on.

Definitions and Use of Figures

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Various embodiments are described herein with reference to the figures. It should be noted that the figures are not necessarily drawn to scale, and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment.

An aspect or an advantage described in conjunction with a particular embodiment is not necessarily limited to that embodiment and can be practiced in any other embodiments even if not so illustrated. References throughout this specification to "some embodiments" or "other embodiments" refer to a particular feature, structure, material or characteristic described in connection with the embodiments as being included in at least one embodiment. Thus, the appearance of the phrases "in some embodiments" or "in other embodiments" in various places throughout this specification are not necessarily referring to the same embodiment or embodiments. The disclosed embodiments are not intended to be limiting of the claims.

Descriptions of Example Embodiments

FIG. 1A illustrates a computing environment 100 in which embodiments of the present disclosure can be implemented. As an option, one or more variations of computing environment 100 or any aspect thereof may be implemented in the context of the architecture and functionality of the embodiments described herein.

FIG. 1A illustrates aspects pertaining to implementing a multi-stage allocation mechanism to dynamically apportion policy-based input/output (I/O or IO) limits to virtual machines based on continuous real-time measurements of IO usage. Specifically, the figure presents a logical depiction of how the herein disclosed techniques can be implemented in a computing environment (e.g., a virtualization environment) to perform multi-stage allocations of policy-based IOPS limits.

The logical depiction of FIG. 1A illustrates two representative computing nodes (e.g., node $102_1$ and node $102_2$) wherein various virtualized entities (e.g., VMs) can perform certain computing tasks. As shown, a representative set of virtual machines (e.g., VM $104_{111}$, VM $104_{112}$, VM $104_{211}$, VM $104_{212}$, and VM $104_{213}$) are situated in the two nodes. The virtual machines (VMs) access a storage pool 110 associated with the nodes through a respective storage I/O controller (e.g., controller $106_1$ at node $102_1$, and controller $106_2$ at node $102_2$). Since the I/O operations performed by the VMs to access the storage pool 110 consume various computing resources of the nodes, those I/O operations are often constrained (e.g., throttled) to manage the distribution of node resources over the virtualized entities at the nodes. Such constraints might be specified in a set of policies associated with the VMs. For example, a first policy (e.g., policy $120_1$) might specify an aggregate IOPS limit 132 of 1500 IOPS to be applied to any VMs (e.g., VM $104_{111}$, VM $104_{112}$, VM $104_{211}$, VM $104_{212}$, and VM $104_{213}$) operating in accordance with the policy. The VMs, in turn, then perform IO operations (e.g., IOs $137_{111}$, IOs $137_{112}$, IOs $137_{211}$, IOs $137_{213}$).

Every IO goes through a controller before being directed to the storage pool. As such the controller at each node (e.g., controller $106_1$ at node $102_1$, and controller $106_2$ at node $102_2$) can perform IO-related functions such as monitoring, throttling, forwarding and redirecting. Various techniques to implement monitoring operations, throttling operations, and other functions of the controllers are discussed in detail as pertains to the figures. In particular, the discussions hereinbelow disclose various techniques to implement various IOPS monitoring functions and various IOPS throttling functions. Application of such monitoring and throttling functions serve to fairly allocate an aggregate IOPS limit (e.g., tenant-specific IOPS limit) to nodes as well as to specific VMs of the corresponding nodes.

Some approaches to allocating the aggregate IOPS limit 132 over the five VMs associated with policy $120_1$ might merely distribute a fixed apportionment (e.g., 300 IOPS) to the VMs. In this regime, VMs can perform I/O operations in any time period as needed, but only up to their individual apportioned amount for that time period. As such, each VM is "throttled" back to its individual apportioned amount so any individual VM will not consume more than an average of 300 IOPS per observation period. As earlier described, such static allocation techniques and throttling against such static allocations can introduce inefficient use of the I/O operations capacity provisioned by policy $120_1$. In particular, when any of the VMs consume less I/O operations (e.g., at a 200 IOPS rate) than their individual allocations for any time period, then the overall quantity of IOPS provisioned to the tenant (e.g., aggregate IOPS limit 132) will not be consumed for that time period. Furthermore, any VMs that require more I/O operations (e.g., at a 400 IOPS rate) than allowed by their statically-allocated amount in a particular time period are "throttled" back even when there are other VMs that are not fully consuming their respective IOPS allocations.

The herein disclosed techniques address fair allocation of such I/O operations and other capacity utilization issues by implementing one or more of several allocation mechanisms to apportion the aggregate IOPS limit 132 (e.g., and other limits) to the nodes and to the VMs of the nodes. As shown, an instance of an inter-node policy manager (e.g., inter-node policy manager $122_1$) that corresponds to a respective policy (e.g., policy $120_1$) accesses an aggregate IOPS limit specified by the policy (operation 1). The policy may also include an IOPS guarantee, which is a minimum amount of IOPS that any particular VM might initially receive in an initial allocation.

In a first allocation stage, the aggregate IOPS limit is distributed over the nodes that host the VMs associated with the policy (operation 2). For example, the 1500 IOPS of aggregate IOPS limit 132 is distributed by inter-node policy manager $122_1$ as node-level IOPS apportionments 142 that comprise 700 IOPS allocated to node $102_1$ and 800 IOPS to node $102_2$. Further to this example, the inter-node policy manager might determine the node-level IOPS apportionments 142 based at least in part on the IOPS capabilities of the nodes. As used in this and certain other embodiments, a node-level IOPS apportionment is an operational limit that is assigned to a particular computing node. The operational limit can be equal to, or less than, or greater than a theoretical or specified functional limitation or performance limitation of the node.

In a second allocation stage, the node-level IOPS apportionments 142 are allocated to the VMs at the nodes (operation 3). As shown, the second allocation stage is performed by instances of intra-node policy managers (e.g., intra-node policy manager $124ii$ and intra-node policy manager $124_{21}$) at each node that correspond to respective policies (e.g., policy $120_1$). For example, the 700 IOPS apportioned to node $102_1$ is allocated as 300 IOPS to VM $104_{111}$ and 400 IOPS to VM $104_{112}$, and the 800 IOPS apportioned to node $102_2$ is allocated as 200 IOPS to VM $104_{211}$, 400 IOPS to VM $104_{212}$, and 200 IOPS to VM $104_{213}$. The foregoing allocations comprise a set of VM-level IOPS apportionments 144 as illustrated in the figure. In some cases, the portion of a node-level IOPS apportionment allocated to a particular VM might initially be based at least in part on the provisioned IOPS (e.g., minimum VM IOPS as guaranteed by an SLA) available at the node of the VM. Alternatively, or in addition to a minimum amount of VM IOPS, the portion of a node-level IOPS apportionment allocated to a particular VM might initially be based at least in part on a higher limit than the minimum limit. Strictly as one example, if there is only one VM on a particular node, that VM might be apportioned all of the IOPS that had been apportioned to that particular node.

The controllers of each node serve to monitor the IOPS usage pertaining to the VMs of respective nodes so as to facilitate adjustments to later-determined instances of node-level IOPS apportionments 142 and/or VM-level IOPS apportionments 144 (operation 4). As shown, operations that constitute the IOPS usage monitoring function 146 can be performed (e.g., by controller $106_1$ observations and by controller $106_2$ observations) over the VMs, and the observed IOPS usage can in turn be used to produce a set of predicted IOPS rates 134 associated with the VMs. The predicted IOPS rates 134 are delivered to the policy managers, which in turn use the predicted IOPS rates to calculate new apportionments (operation 5). In some cases, such as is shown, the predicted IOPS rates 134 can be accessed by the inter-node policy managers (e.g., inter-node policy manager $122_1$) and/or the intra-node policy managers (e.g., intra-node policy manager $124_{11}$, intra-node policy manager $124_{21}$, etc.) to determine the node-level IOPS apportionments 142 and/or VM-level IOPS apportionments 144, respectively. As used herein in this and certain other embodiments, the term VM-level IOPS refers to a portion of node-level IOPS that are assigned to a particular virtual machine.

Such dynamic apportioning of IOPS limits improves the utilization of the I/O operations provisioned in accordance with a corresponding policy. As an example, based at least in part on predicted IOPS rates 134, VM $104_{112}$ and VM $104_{212}$ are each allocated 400 IOPS while VM $104_{211}$ and VM $104_{213}$ are each allocated 200 IOPS. Applications of the herein disclosed multi-stage IOPS allocation techniques thereby improve the utilization of computing resources such as computer processing power, computer memory and data storage, network bandwidth, and/or other computing resources.

In some environments, individual VMs are not individually throttled, and instead, the IOPS that are apportioned to a particular node can be shared by any and all VMs or other processes running on the particular node. Such an environment is shown and described as pertains to FIG. 1B.

Figure 1B:
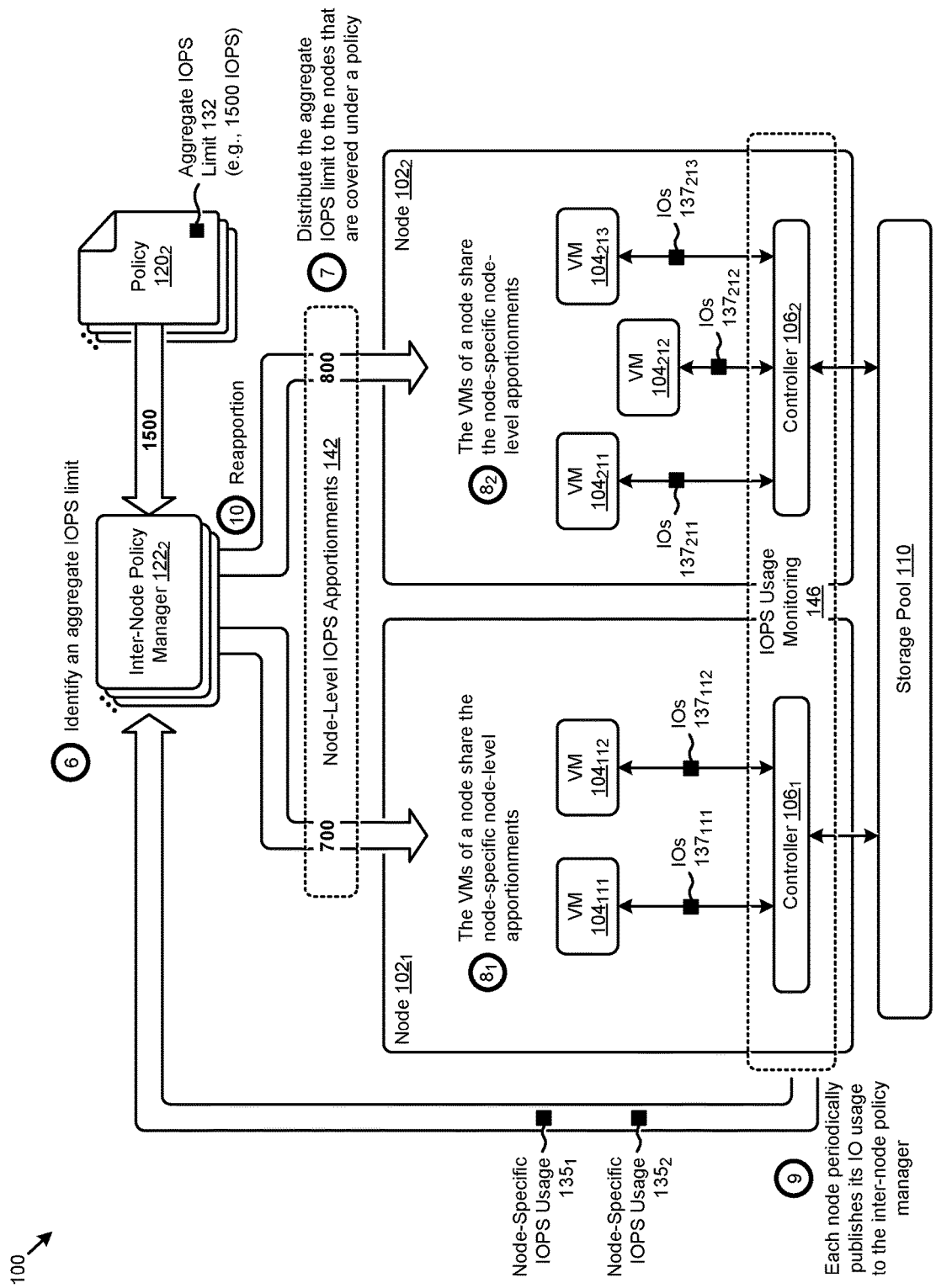
FIG. 1B illustrates aspects pertaining to dynamically apportioning policy-based IOPS limits to specific nodes of a cluster based on continuous real-time measurements of IOPS usage at each node, according to an embodiment.

FIG. 1B illustrates aspects pertaining to dynamically apportioning policy-based IOPS limits to specific nodes of a cluster based on continuous real-time measurements of IOPS usage at each node. This embodiment differs from the embodiment of FIG. 1A at least in that, rather than apportioning node-level IOPS to specific VMs of the nodes, any individual VM of any number of VMs running on that node can consume IOPS without being throttled until the total IOPS limit for the entire node is reached.

As shown, an instance of an inter-node policy manager (e.g., inter-node policy manager $122_2$) that corresponds to a respective policy (e.g., policy $120_2$) accesses an aggregate IOPS limit specified by the policy (operation 6). The policy may also include an IOPS guarantee, which is a minimum amount of IOPS that any particular group of VMs (e.g., group of VMs belonging to a particular tenant) might initially receive in an initial VM group allocation. The policy may also include an individual VM IOPS guarantee, which is a minimum amount of IOPS that any particular VM might initially receive in an initial allocation. In addition, or alternatively, a policy may include a throttling value that is a maximum aggregate quantity of IOPS that any set of VMs on a particular node might initially receive. In addition, or alternatively, a policy may also include an IOPS guarantee that is specific to a particular type of VM (e.g., a database manager VM), which is a minimum guaranteed amount of IOPS any particular VM of a particular type might initially receive. In addition, or alternatively, a policy may also include an IOPS guarantee that is specific to a particular virtualized entity (e.g., a vDisk) of a VM. As such, any of the aforementioned policies can be hierarchical, for example, following a hierarchy from tenant down to node(s), from nodes down to VM(s), from VMs down to virtualized entities, etc. The constituents of the hierarchy can change dynamically, for example, when a tenant's VM is migrated from one node to another node. In such a case, the node identifier in the node level of the hierarchy can change at the same time that the migration occurs.

In some cases, in particular when a particular node hosts a large number of VMs, it can happen that allocating the initial minimum amount of IOPS can oversubscribe the node as a whole. This is resolved at least in that the oversubscription situation would be remedied by node-level throttling. That is, since in this embodiment, any number of VMs running on that node can consume any amount of IOPS up until the total IOPS limit for the entire node is reached, a VM-level apportionment can be oversubscribed without negative impact.

Continuing the discussion of FIG. 1B, at operation 7, the aggregate amount of IOPS in the policy are distributed across the group of nodes that are covered under the policy. The shown example depicts only two nodes however, a cluster can support any number of nodes. A first tenant might be restricted to a first group of nodes that is mutually exclusive to a second group of nodes that host VMs belonging to a second tenant, and so on. As such, it is common that one tenant may host its virtual machines on a large number of nodes of the cluster. In the shown two node embodiment, the VMs at each node share the IOPS that are apportioned to the hosting node. For example, node $102_1$ is apportioned 700 IOPS, whereas node $102_2$ is apportioned 800 IOPS. Operation 81 indicates that all VMs of node $102_1$ share the 700 IOPS apportionment, being limited only by the total number of IOPS apportioned to that node. Similarly, operation 82 indicates that all VMs of node $102_2$ share the 800 IOPS that had been apportioned to that node. This form of sharing has the characteristic of avoiding underutilization of a node's capacity. Due to sharing regimes where each and every VM on a node receives the total amount of IOPS that had been apportioned to that node, it can happen that the node as a whole can be oversubscribed. Oversubscription is resolved at least in that the oversubscription situation would be remedied by node-level throttling that would occur in forthcoming apportionments based on actual usage as monitored over corresponding observation periods.

The VMs at each node generate IOs (e.g., IOs $137_{111}$, IOs $137_{112}$, IOs $137_{211}$, $137_{212}$, IOs $137_{213}$), which IOs are processed by each node's node-specific controller. As such, operation 9 is performed at each node. Periodically, each node publishes its IO usage to the inter-node policy manager. As shown, the acts of publication of the node-specific IO usage include delivering node-specific IO usage measurements (e.g., node-specific IOPS usage $135_1$, and node-specific IOPS usage $135_2$). The inter-node policy manager can in turn reapportion the aggregate IOPS across the nodes in an apportionment that considers the published node-specific usage (operation 10).

In some situations, the different nodes have different capabilities, and as such one node might be configured to be able to perform many more IOPS than another node. Strictly as one example, a first node might employ a 1 Gbps IO channel, while another node might employ a 10 Gbps channel. As another example, a first node might employ 2 parallel storage IO channels, while another node might employ 8 parallel channels. Accordingly, the reapportioning of IOPS that occurs in operation 10 might include reapportioning based on each node's IOPS capability.

Figure 2:
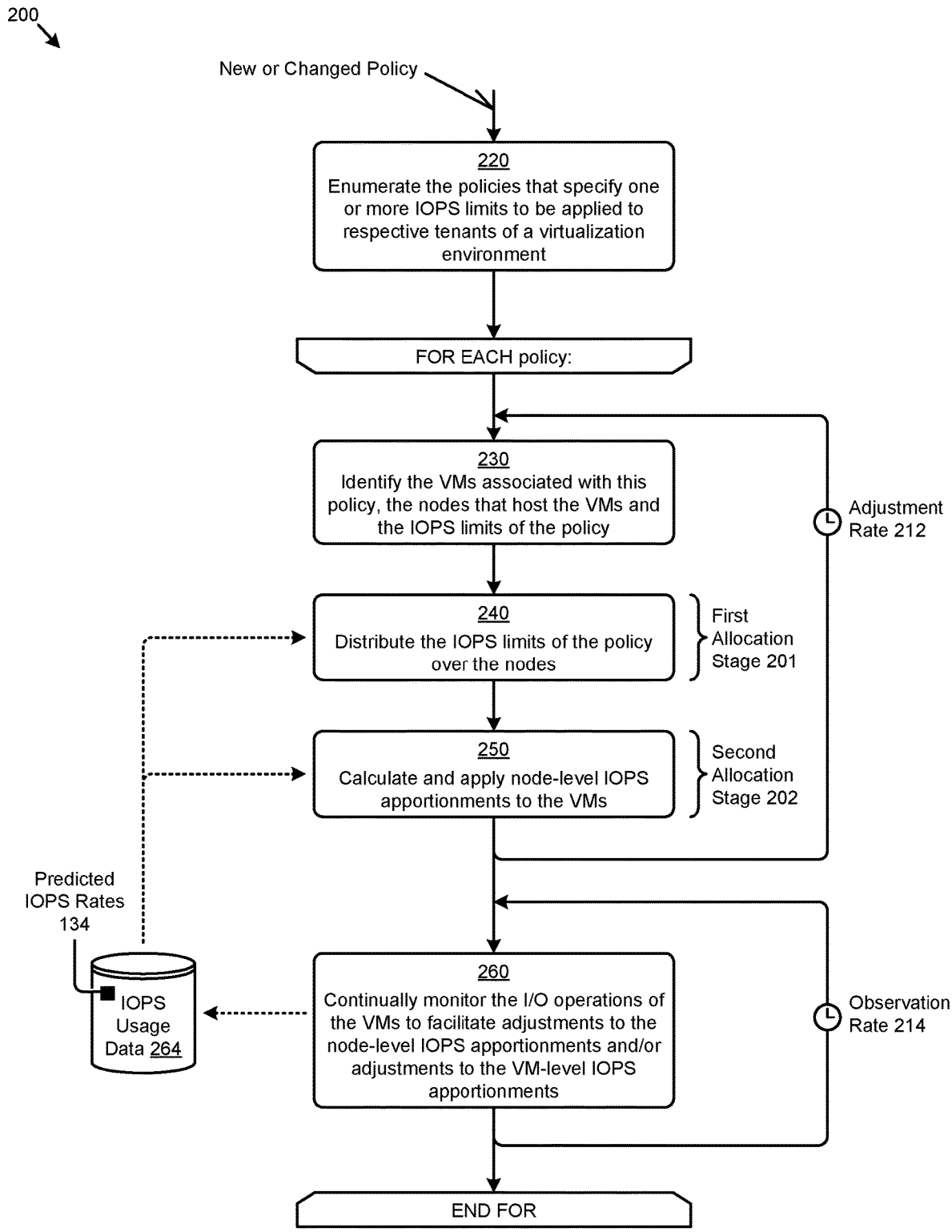
FIG. 2 depicts a multi-stage IOPS allocation technique as implemented in systems that implement multi-stage allocations of an aggregate IOPS limit, according to an embodiment.

FIG. 2 depicts a multi-stage IOPS allocation technique 200 as implemented in systems that implement multi-stage allocations of an aggregate IOPS limit. As an option, one or more variations of multi-stage IOPS allocation technique 200 or any aspect thereof may be implemented in the context of the architecture and functionality of the embodiments described herein. The multi-stage IOPS allocation technique 200 or any aspect thereof may be implemented in any environment.

FIG. 2 illustrates one aspect pertaining to implementing a multi-stage allocation mechanism to dynamically apportion policy-based IO limits to virtual machines based on continuous real-time measurements of IO usage. Specifically, the figure presents one embodiment of certain steps and/or operations that facilitate multi-stage allocation of IOPS limits that are dynamically adjusted based at least in part on observed IOPS usage.

The multi-stage IOPS allocation technique 200 can commence by enumerating the policies (e.g., SLAs, subscriptions, contracts, etc.) that each specify one or more IOPS limits to be applied to respective tenants of a virtualization environment (step 220). In some cases, such IOPS limits directly correspond to at least a portion of the costs incurred by the tenants for use of the computing resources of the virtualization environment. For example, the IOPS limits for a particular policy might comprise an aggregate IOPS limit and a provisioned IOPS limit. An aggregate IOPS limit is a maximum IOPS rate that is provisioned over the virtualized entities associated with the limit (e.g., per a particular policy and/or tenant). A provisioned IOPS limit is a minimum IOPS rate that is provisioned over the virtualized entities associated with the limit (e.g., per a particular policy and/or tenant). For example, a provisioned IOPS limit might correspond to the sum of the respective default IOPS rates as specified in the configurations of the virtualized entities.

For each policy from the enumerated policies, the VMs and the corresponding nodes (e.g., that host the VMs), as well as the aggregate IOPS limits associated with that node, as well as any other policy data associated with the policy are identified (step 230). The VMs might be the virtualized entities implemented by a tenant in accordance with a particular policy (e.g., subscription agreement) that, for example, specifies the maximum IOPS the VMs can consume. The IOPS limits of the policy are distributed over the nodes in a first allocation stage 201 (step 240). In some cases, the IOPS limits might be distributed over the nodes based at least in part on the IOPS capabilities of the nodes or on the IOPS usage of the VMs at the nodes, as later discussed in more detail. In a second allocation stage 202, the node-level IOPS apportionments of the IOPS limits are allocated to respective VMs that are implemented at the nodes (step 250). The resulting VM-level IOPS apportionments might be determined based at least in part on the provisioned IOPS (e.g., minimum VM IOPS) that comprise the node-level IOPS apportionments at the nodes of the VMs. The VM-level IOPS apportionments might also be determined based at least in part on the IOPS usage at the VMs, as discussed in more detail as follows.

In accordance with the multi-stage IOPS allocation technique 200 and/or other herein disclosed techniques, the I/O operations performed by the VMs are continually monitored to facilitate adjustments to the node-level IOPS apportionments and/or the VM-level IOPS apportionments (step 260). As can be observed, such monitoring might produce updated instances of the predicted IOPS rates 134 earlier described at an observation rate 214 (e.g., every 10 seconds). The instances of the predicted IOPS rates 134 might be stored in a set of IOPS usage data 264 to facilitate the apportionment adjustments. As certain steps and/or operations (e.g., step 230, step 240, and step 250) of multi-stage IOPS allocation technique 200 are repeated at some adjustment rate 212 (e.g., every 10 seconds, every minute, etc.), the continually updated instances of the predicted IOPS rates 134 for the subject VMs are accessed to dynamically apportion the IO limits over the nodes and VMs. A change to a policy or an addition of a new applicable policy might cause re-entry into the flow such that the changed or new policy can be considered when allocating IOPS to the operational components of the system (e.g., nodes or VMs).

One embodiment of a system for implementing the multi-stage IOPS allocation technique 200 and/or other herein disclosed techniques is disclosed as follows.

Figure 3A:
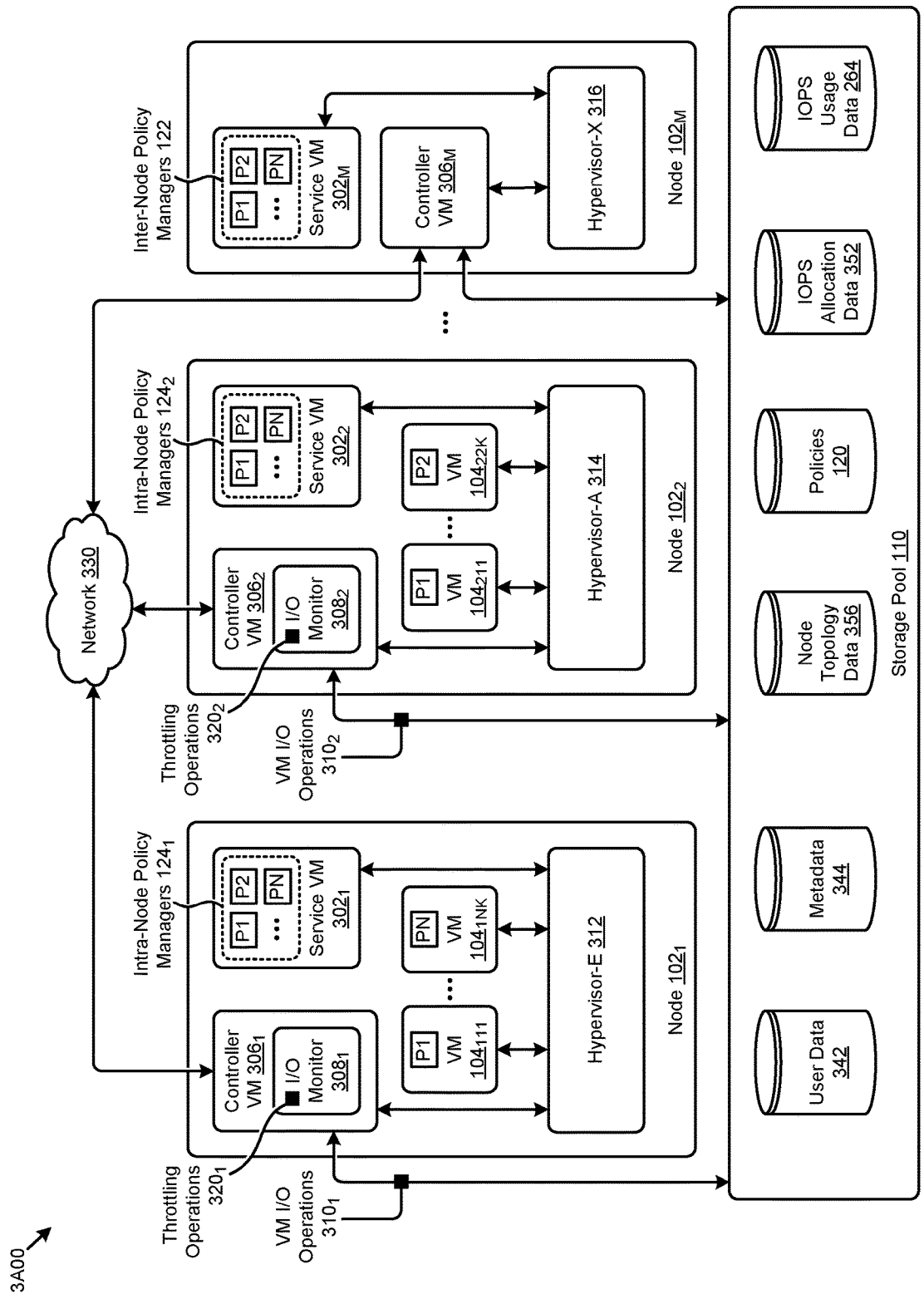
FIG. 3A presents a block diagram of a system that implements multi-stage allocations of an aggregate IOPS limit in virtualization environments, according to an embodiment.

FIG. 3A presents a block diagram of a system 3A00 that implements multi-stage allocations of an aggregate IOPS limit in virtualization environments. As an option, one or more variations of system 3A00 or any aspect thereof may be implemented in the context of the architecture and functionality of the embodiments described herein. The system 3A00 or any aspect thereof may be implemented in any environment.

FIG. 3A illustrates one aspect pertaining to implementing a multi-stage allocation mechanism to dynamically apportion policy-based IO limits to virtual machines based on continuous real-time measurements of IO usage. Specifically, the figure is being presented to show one embodiment of certain representative components and associated data flows that describes how the herein disclosed techniques might be implemented in a modern computing system (e.g., virtualization computing system). The components and data flows shown in FIG. 3A present one partitioning and associated data manipulation approach. The specific example shown is purely exemplary, and other subsystems, data structures, and/or partitioning are reasonable.

As shown in FIG. 3A, the system 3A00 comprises three representative nodes (e.g., node $102_1$, node $102_2$, . . . , node $102_M$) that have multiple tiers of storage in a storage pool 110. Each node can be associated with one server, multiple servers, or portions of a server. The nodes can be associated (e.g., logically and/or physically) with one or more computing clusters. The multiple tiers of storage in storage pool 110 can include instances of local storage. For example, the local storage can be within or directly attached to a server and/or appliance associated with the nodes. Such local storage can include solid state drives (SSDs), hard disk drives (HDDs), and/or other storage devices. In some embodiments, the multiple tiers of storage can include storage that is accessible through a network 330 such as a networked storage (e.g., a storage area network or SAN, network attached storage or NAS, etc.).

As shown, any of the nodes of system 3A00 can implement one or more virtualized entities such as virtual machines (e.g., VM $104_{111}$, ..., VM $104_{1NK}$, VM $104_{211}$, ..., VM $104_{22K}$, controller VM $306_1$, controller VM $306_2$, controller VM $306_M$, service VM $302_1$, service VM $302_2$, and service VM $302_M$) and/or executable containers. The VMs can be characterized as software-based computing "machines" implemented in a hypervisor-assisted virtualization environment that emulates the underlying hardware resources (e.g., CPU, memory, etc.) of the nodes. For example, multiple VMs can operate on one physical machine (e.g., node host computer) running a single host operating system, while the VMs run multiple applications on various respective guest operating systems. Such flexibility can be facilitated at least in part by one of a variety of heterogeneous hypervisors (e.g., hypervisor-E 312, hypervisor-A 314, or hypervisor-X 316), which hypervisors are logically located between the various guest operating systems of the VMs and the host operating system of the physical infrastructure (e.g., the nodes). In some implementations the controller VMs and/or service VMs carry out communications with any one or more of the heterogeneous hypervisors via sending and receiving messages over a packet-switched network such as a local area network (LAN).

As an alternative, executable containers may be implemented at the nodes in an operating system-based virtualization environment or container virtualization environment. The executable containers are implemented at the nodes in an operating system virtualization environment or, they might be implemented in a container-centric virtualization environment. The executable containers comprise groups of processes and/or resources (e.g., memory, CPU, disk, etc.) that are isolated from the node host computer and other containers. Such executable containers directly interface with the kernel of the host operating system without, in most cases, a hypervisor layer. This lightweight implementation can facilitate efficient distribution of certain software components such as applications or services (e.g., micro-services). Any node of system 3A00 can implement both a hypervisor-assisted virtualization environment and a container virtualization environment for various purposes.

Furthermore, any node in system 3A00 can implement a virtualized controller to facilitate, at least in part, access to storage facilities (e.g., storage pool 110, networked storage, etc.) by the VMs and/or the executable containers operating at the node. As used in these embodiments, a virtualized controller is a collection of software instructions that serve to abstract details of underlying hardware or software components from one or more higher-level processing entities. A virtualized controller can be implemented as a virtual machine, as an executable container (e.g., a Docker container), or within a layer (e.g., such as a hypervisor layer). As can be observed in system 3A00, an instance of a virtual machine (e.g., controller VM $306_1$, controller VM $306_2$, and controller VM $306_M$) at each node is used as a virtualized controller to, at least in part, manage storage and I/O operations (e.g., VM I/O operations $310_1$ and VM I/O operations $310_2$) at the nodes. The controller VMs of the nodes in system 3A00 interact using communications over network 330.

The virtualized entities at the nodes of system 3A00 can interface with the controller VM of the node through a respective hypervisor. In such cases, the controller VM is not formed as part of specific implementations of a given hypervisor. Instead, the controller VM can run as a virtual machine above the hypervisor at the various nodes. When the controller VMs run above the hypervisors, varying virtual machine architectures and/or hypervisors can operate with the system 3A00. For example, a hypervisor (e.g., hypervisor-E 312) at one node might correspond to software from a first vendor (e.g., Vendor-E), and a hypervisor (e.g., hypervisor-A 314) at another node might correspond to a second software vendor (e.g., Vendor-A). As another virtualized controller implementation example, executable containers (e.g., Docker containers) can be used to implement a virtualized controller in an operating system virtualization environment at a given node. In this case, for example, the virtualized entities at a particular node can interface with a controller container through a hypervisor and/or the kernel of the host operating system of the node. Such interactions between the virtualized entities and controllers at the nodes often pertain to various instances (e.g., replicated instances) of user data 342 and metadata 344 that are distributed over the storage pool 110 to facilitate certain tasks and/or operations performed at virtualized entities.

Other components are implemented in system 3A00 to facilitate the herein disclosed techniques. Specifically, instances of inter-node policy managers 122 (e.g., corresponding to policy "P1", policy "P2", ..., policy "PN") are implemented at the service VM $302_M$ of node $102_M$. The inter-node policy managers 122 might be implemented in a dedicated node due to the large workload performed by the inter-node policy managers 122. As shown, instances of intra-node policy managers $124_1$ are implemented at node $102_1$, and instances of intra-node policy managers $124_2$ are implemented at node $102_2$. Each instance of the intra-node policy managers at a particular node manages the VM-level IOPS apportionments that are associated with a respective policy (e.g., policy "P1", policy "P2", ..., policy "PN"). Instances of I/O monitors (e.g., I/O monitor $308_1$ and I/O monitor $308_2$) are implemented at respective controllers (e.g., controller VM $306_1$ and controller VM $306_2$) at the nodes to track the I/O operations at the VMs (e.g., VM I/O operations $310_1$ and VM I/O operations $310_2$). In some cases, the monitored I/O operations are accessed by the I/O monitors to perform certain throttling operations (e.g., throttling operations $320_1$ and throttling operations $320_2$).

To further facilitate the herein disclosed techniques, various storage facilities are implemented in storage pool 110 for access by the nodes associated with the storage pool. Specifically, and as shown, such storage facilities store and/or organize data pertaining to the node-level and/or VM-level IOPS apportionments (e.g., stored in IOPS allocation data 352), the historical and/or predicted IOPS rates at the VMs (e.g., stored in IOPS usage data 264), the organization and/or configuration of the nodes in the system (e.g., stored in node topology data 356), the attributes and/or parameters of the policies (e.g., stored in policies 120), and/or data pertaining to other aspects of the herein disclosed techniques.

Further details of the data structures associated with the foregoing storage facilities are disclosed as follows.

Figure 3B:
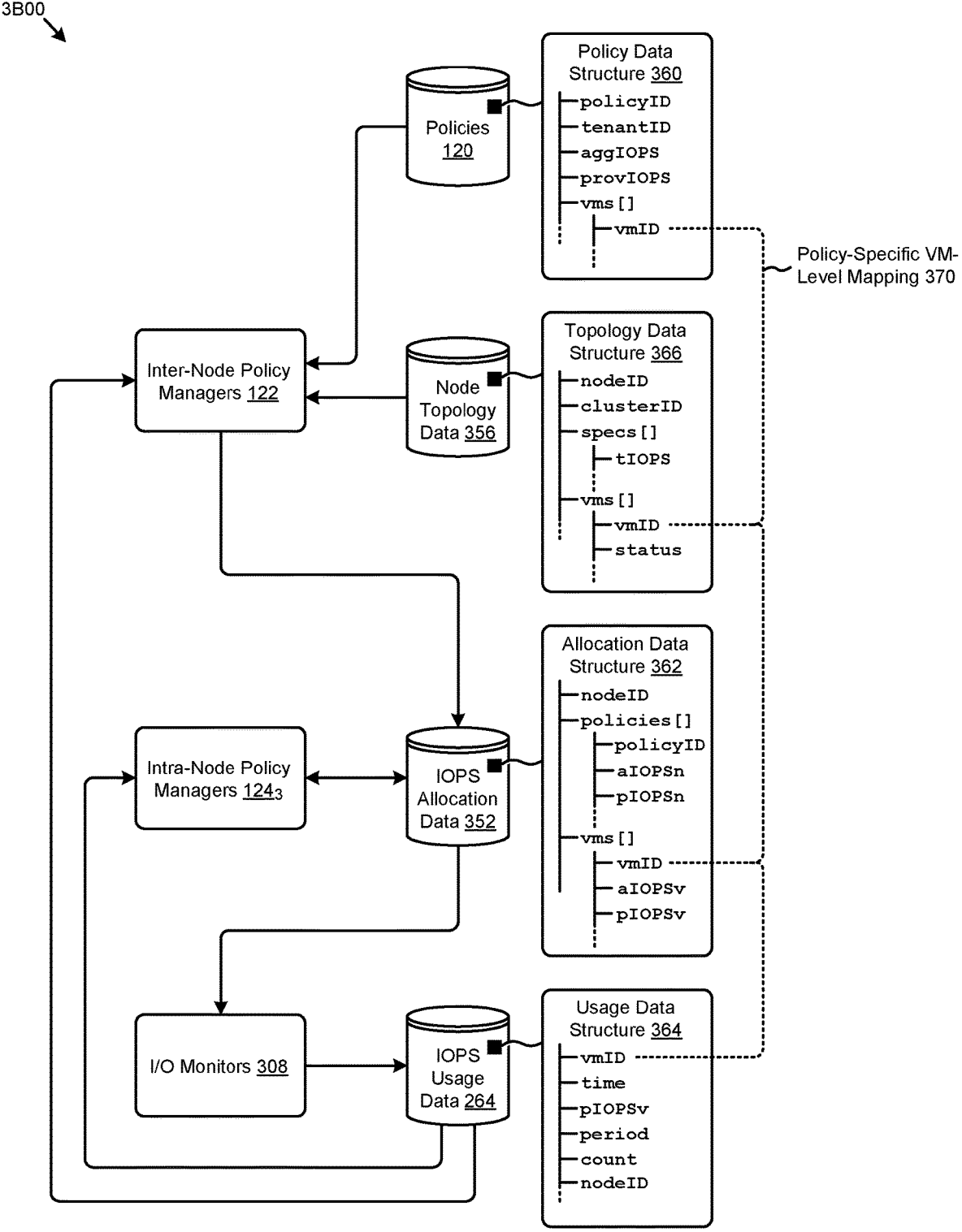
FIG. 3B depicts a set of specialized data structures that improve the way a computer stores and retrieves data in memory when performing steps pertaining to multi-stage allocation of IOPS limits in virtualization environments, according to the herein-disclosed embodiments.

FIG. 3B depicts a set of specialized data structures 3B00 that improve the way a computer stores and retrieves data in memory when performing steps pertaining to multi-stage allocation of IOPS limits in virtualization environments. As an option, one or more variations of specialized data structures 3B00 or any aspect thereof may be implemented in the context of the architecture and functionality of the embodiments described herein. The specialized data structures 3B00 or any aspect thereof may be implemented in any environment.

FIG. 3B illustrates one aspect pertaining to implementing a multi-stage allocation mechanism to dynamically apportion policy-based IO limits to virtual machines based on continuous real-time measurements of IO usage. Specifically, the figure is being presented to illustrate one embodiment of data structures that can be implemented to organize certain data used when implementing the herein disclosed techniques. The figure furthers illustrates a logical depiction of data flows of such data over various system components earlier described.

Specifically shown in FIG. 3B are instances of inter-node policy managers 122, instances of intra-node policy managers 124₃, and instances of I/O monitors 308 that interact with policies 120, node topology data 356, IOPS allocation data 352, and IOPS usage data 264. As shown, the inter-node policy managers 122 consume data from policies 120, node topology data 356, and IOPS usage data 264 to populate certain data (e.g., node-level IOPS apportionments) in IOPS allocation data 352. The intra-node policy managers 124₃ consume data from IOPS allocation data 352 and IOPS usage data 264 to populate other data (e.g., VM-level IOPS apportionments) in IOPS allocation data 352. The I/O monitors 308 access data at IOPS allocation data 352 and informs the IOPS usage data 264.

The data comprising policies 120, node topology data 356, IOPS allocation data 352, IOPS usage data 264, and/or any other data described herein can be organized and/or stored using various techniques. For example, the policy data structure 360 associated with policies 120 indicates that policy information (e.g., attributes, parameters, etc.) might be organized and/or stored in a tabular structure (e.g., relational database table) that has rows that relate various policy attributes with a particular policy. As another example, the information might be organized and/or stored in a programming code object that has instances corresponding to a particular policy and properties corresponding to the various attributes associated with the policy. As depicted in policy data structure 360, a data record (e.g., table row or object instance) for a particular policy might describe a policy identifier (e.g., stored in a "policyID" field), a tenant identifier (e.g., stored in a "tenant ID" field), an aggregate IOPS limit (e.g., stored in an "aggIOPS" field), a provisioned IOPS limit (e.g., stored in a "provIOPS" field), a list of VMs associated with the policy (e.g., stored in a "vms [ ]" object), and/or other policy attributes. Each instance of the "vms [ ]" object might comprise a VM identifier (e.g., stored in a "vmID" field) and/or other attributes of a particular VM associated with the policy.

As indicated by the topology data structure 366 associated with node topology data 356, a data record (e.g., table row or object instance) for a particular node might describe a node identifier (e.g., stored in a "nodeID" field), a cluster identifier (e.g., stored in a "cluster ID" field), a set of specifications for the node (e.g., stored in a "specs [ ]" object), a list of VMs implemented at the node (e.g., stored in a "vms [ ]" object), and/or other node attributes. Each instance of the "specs [ ]" object might comprise a theoretical IOPS capability of the node (e.g., stored in a "tIOPS" field) and/or other specifications associated with the node. Each instance of the "vms [ ]" object might comprise a VM identifier (e.g., stored in a "vmID" field), a VM status description (e.g., stored in a "status" field), and/or other attributes associated with a particular VM at the node.

The allocation data structure 362 of IOPS allocation data 352 indicates that a data record (e.g., table row or object instance) for a particular node might describe a node identifier (e.g., stored in a "nodeID" field), allocation data corresponding to a set of policies associated with the node (e.g., stored in a "policies [ ]" object), allocation data corresponding to a set of VMs implemented at the node (e.g., stored in a "vms [ ]" object), and/or other allocation data pertaining to the node. Each instance of the "policies [ ]" object might comprise a policy identifier (e.g., stored in a "policyID" field), a node-level IOPS apportionment of an aggregate IOPS limit (e.g., stored in an "aIOPSn" field), a node-level IOPS apportionment of a provisioned IOPS limit (e.g., stored in a "pIOPSn" field), and/or other allocation data associated with a particular policy at the node. Each instance of the "vms [ ]" object might comprise a VM identifier (e.g., stored in a "vmID" field), a VM-level IOPS apportionment of an aggregate IOPS limit (e.g., stored in an "aIOPSv" field), a VM-level IOPS apportionment of a provisioned IOPS limit (e.g., stored in a "pIOPSv" field), and/or other allocation data associated with a particular VM at the node.

In this and other multi-node configurations, instances of node-specific IOPS usage data might be stored in and/or be organized in accordance with a usage data structure 364. As such, a data record (e.g., table row or object instance) for a particular VM might describe a VM identifier (e.g., stored in a "vmID" field), a time stamp (e.g., stored in a "time" field), a predicted IOPS rate for a corresponding VM (e.g., stored in a "pIOPSv" field), an observation period value (e.g., a number of seconds stored in a "period" field), an I/O operations count over the observation period (e.g., stored in a "count" field), a node identifier (e.g., stored in a "node ID" field), and/or other IOPS-related attributes associated with the VM.

The foregoing instances of specialized data structures 3B00 illustrated in FIG. 3B facilitate policy-specific apportioning of IOPS limits at a VM-level granularity. Specifically, and as indicated by policy-specific VM-level mapping 370, the presence of a VM identifier (e.g., stored in a "vmID" field) at each of the data structures facilitates the identification of relationships between the data sets and/or data types stored in the data structures.

Such data relationships can be used in earlier discussed techniques for distributing IOPS limits over a set of nodes (e.g., step 240 of FIG. 2), which techniques are disclosed in further detail as follows.

Figure 4:
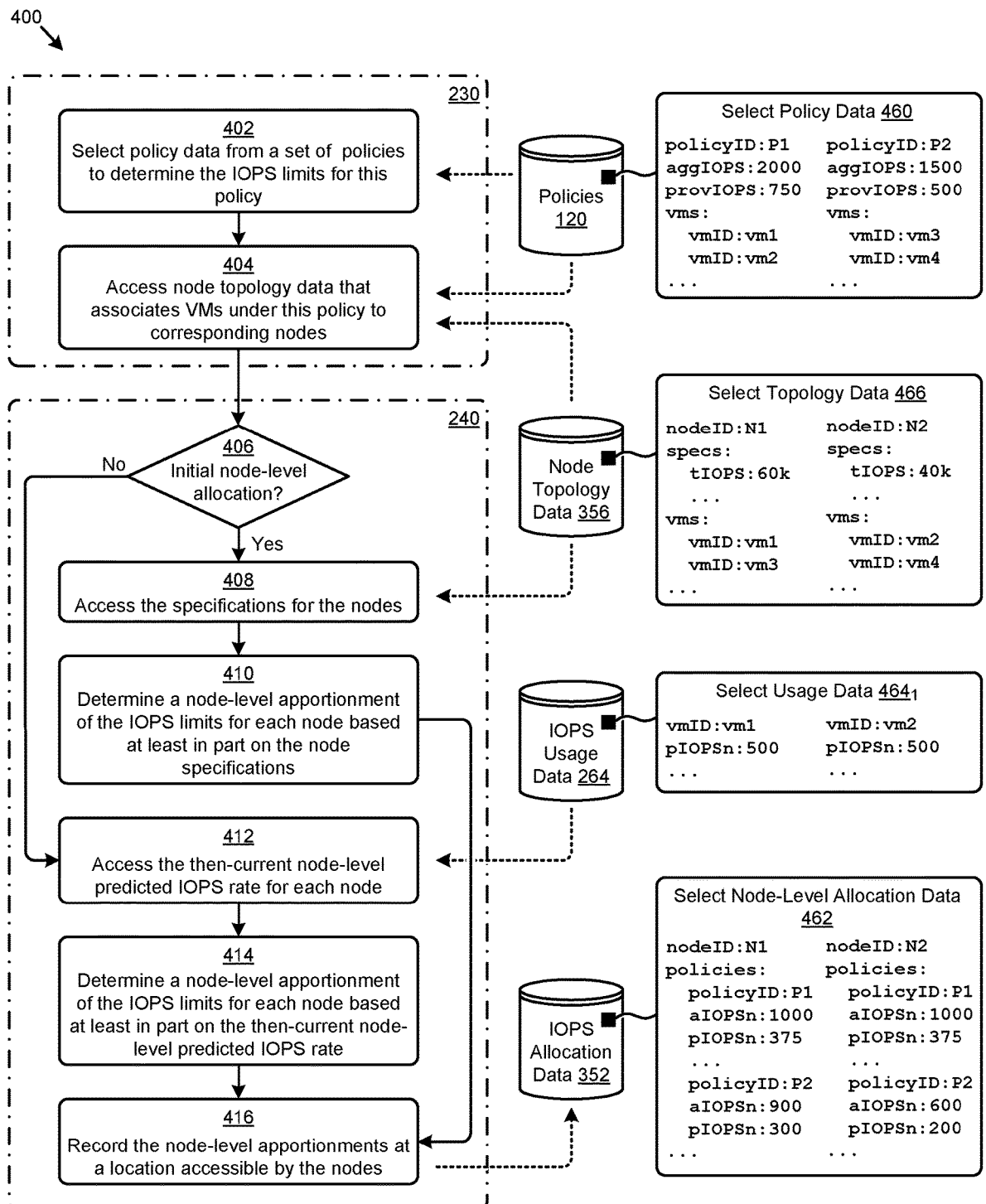
FIG. 4 presents an inter-node allocation technique as implemented in systems that facilitate multi-stage allocations of IOPS in virtualization environments, according to an embodiment.

FIG. 4 presents an inter-node allocation technique 400 as implemented in systems that facilitate multi-stage allocations of IOPS in virtualization environments. As an option, one or more variations of inter-node allocation technique 400 or any aspect thereof may be implemented in the context of the architecture and functionality of the embodiments described herein. The inter-node allocation technique 400 or any aspect thereof may be implemented in any environment.

FIG. 4 illustrates one aspect pertaining to implementing a multi-stage allocation mechanism to dynamically apportion policy-based IO limits to virtual machines based on continuous real-time measurements of IO usage. Specifically, the figure is presented to illustrate one embodiment of certain steps and/or operations for performing the first stage of allocating IOPS limits to the nodes associated with a particular policy. Certain select data is also shown in the figure to illustrate an example application of the inter-node allocation technique 400. The shown embodiment depicts an occurrence of an operation in step 402 followed by an occurrence of an operation in step 404 in one possible partitioning of step 230 of FIG. 2. Also, the shown embodiment depicts operations from decision 406 through step 416 together with corresponding data inputs and outputs as one possible partitioning of step 240 of FIG. 2. Other partitioning and other ordering of the operations are possible.

For each particular policy to be processed according to the inter-node allocation technique 400, the IOPS limits (e.g., aggregate IOPS limit, provisioned IOPS limit, etc.) associated with the policy are determined (step 402). For example, in a first case, policies 120 might be accessed to determine an aggregate IOPS limit of "2000" and a provisioned IOPS limit of "750" for a policy "P1" as described in select policy data 460. In a second case, an aggregate IOPS limit of "1500" and a provisioned IOPS limit of "500" for a policy "P2" might be determined. The VMs and corresponding nodes associated with the policy are identified (step 404). The select policy data 460 of policies 120 and the select topology data 466 of node topology data 356 might be accessed and combined (e.g., via a lookup or JOIN operation) to identify that VM "vm1" of node "N1" and VM "vm2" of node "N2" are each associated with policy "P1", and VM "vm3" of node "N1" and VM "vm4" of node "N2" are each associated with policy "P2".

If this is an initial node-level allocation to the identified nodes (see "Yes" path of decision 406), then the specifications of the nodes are accessed (step 408) to determine a node-level IOPS apportionment of the IOPS limits for each node based at least in part on the node specifications (step 410). As an example, if policy "P2" is a newly implemented policy such that this time through the flow of FIG. 4 would be an initial allocation for node "N1" and node "N2" associated with the new policy, then the performance specifications for those nodes are accessed to determine the initial allocation. Specifically, the theoretical IOPS capability of the nodes (e.g., "60k" for "N1" and "40k" for "N2") might be consulted to determine the node-level IOPS apportionment of the IOPS limits. As shown in select node-level allocation data 462 (e.g., selected from IOPS allocation data 352), the IOPS limits (e.g., "aIOPSn" and "pIOPSn") for policy "P2" are allocated to nodes "N1" and "N2" in accordance with the respective "tIOPS" for the nodes.

If a test determines that this is not an initial node-level allocation to the identified nodes (see "No" path of decision 406), then the then-current node-level predicted IOPS rates of the nodes are accessed (step 412) to determine a node-level IOPS apportionment of the IOPS limits for each node based at least in part on the then-current node-level predicted IOPS rates (step 414). The node-level predicted IOPS rate of a node as pertaining to a particular policy is derived from the predicted IOPS rates of the underlying VMs that are hosted at the node and associated with the policy. As an example, the node-level predicted IOPS rate of node "N1" for policy "P1" is derived from the predicted IOPS rate of "500" for VM "vm1", as indicated in the select usage data 464$_1$ from IOPS usage data 264. The node-level predicted IOPS rate of node "N2" for policy "P1" is derived from the predicted IOPS rate of "500" for VM "vm2". The node-level apportionments of the IOPS limits (e.g., "aIOPSn" and "pIOPSn") of policy "P1" are allocated to node "N1" and "N2" proportionately with respect to the most recent predicted IOPS rate. This is shown in the select node-level allocation data 462.

Whether the node-level allocation is an initial allocation or a subsequent allocation, the determined node-level IOPS apportionments are recorded (e.g., in IOPS allocation data 352) for access by the nodes (step 416). The recorded node-level IOPS apportionments can be used in earlier discussed techniques for allocating node-level IOPS apportionments to the VMs of the nodes (e.g., step 250 of FIG. 2), which techniques are disclosed in further detail as follows.

Figure 5:
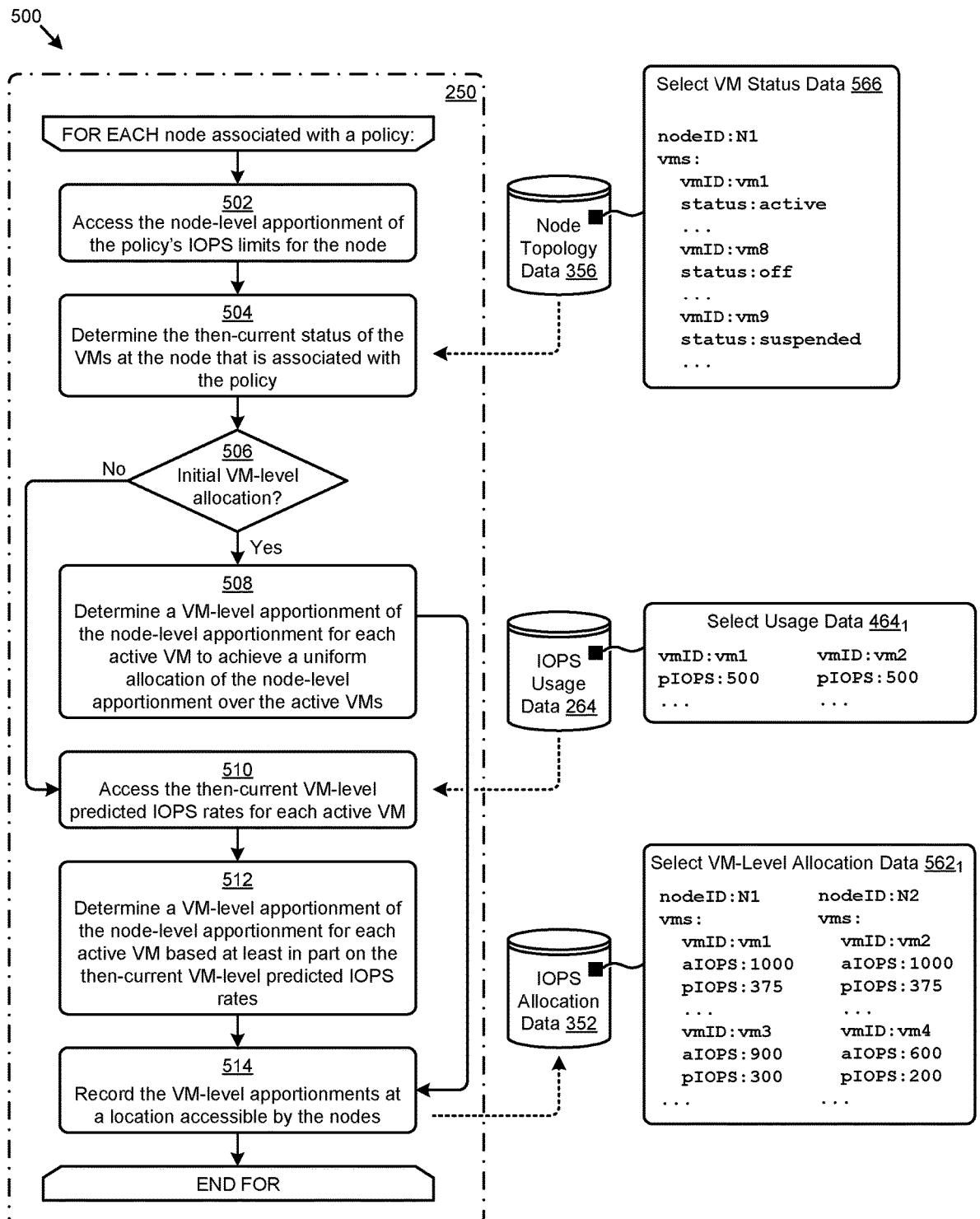
FIG. 5 depicts an intra-node allocation technique as implemented in systems that facilitate multi-stage allocations of IOPS in virtualization environments, according to an embodiment.

FIG. 5 depicts an intra-node allocation technique 500 as implemented in systems that facilitate multi-stage allocations of IOPS in virtualization environments. As an option, one or more variations of intra-node allocation technique 500 or any aspect thereof may be implemented in the context of the architecture and functionality of the embodiments described herein. The intra-node allocation technique 500 or any aspect thereof may be implemented in any environment. The shown embodiment depicts operations from step 502 through step 514 together with corresponding data inputs and outputs as one possible partitioning of step 250 of FIG. 2. Other partitioning and other ordering of the operations are possible.

FIG. 5 illustrates one aspect pertaining to implementing a multi-stage allocation mechanism to dynamically apportion policy-based IO limits to virtual machines based on continuous real-time measurements of IO usage. Specifically, the figure is presented to illustrate one embodiment of certain steps and/or operations for performing the second stage of allocating IOPS limits to the virtualized entities (e.g., VMs) associated with a particular policy. Certain select data is also shown in the figure to illustrate an example application of the intra-node allocation technique 500.

For each node associated with a particular policy to be processed according to the intra-node allocation technique 500, the node-level IOPS apportionment of the policy's IOPS limits (e.g., aggregate IOPS limit, provisioned IOPS limit, etc.) allocated to the node is accessed (step 502). For example, the select node-level allocation data 462 earlier described as pertains to FIG. 4 might be accessed to determine the node-level IOPS apportionments for node "N1" or node "N2". The then-current status of the VMs hosted at the node and associated with the policy is determined (step 504). As an example, the select VM status data 566 from node topology data 356 might be accessed to determine that the status of VM "vm1" at node "N1" is "active". As can be observed, other status descriptions such as "off" or "suspended" are possible.

If this is an initial VM-level allocation at the node (see "Yes" path of decision 506), then the VM-level IOPS apportionments at the node are determined by uniformly allocating the node-level IOPS apportionment to the active VMs associated with policy (step 508). For example, if policy "P2" is a newly implemented policy such that this is an initial allocation for VMs "vm3" and "vm4" at nodes "N1" and "N2", respectively, then the node-level IOPS apportionments at nodes "N1" and "N2" are distributed uniformly to the underlying VMs. Since each node has one underlying VM, the node-level IOPS apportionments pass through to the VMs as indicated in a set of select VM-level allocation data 562$_1$ from the IOPS allocation data 352.

If this is not an initial VM-level allocation for the particular node and policy (see "No" path of decision 506), then the then-current VM-level predicted IOPS rates of the active VMs are accessed (step 510) to determine a VM-level IOPS apportionment of the node-level IOPS apportionment for each active VM based at least in part on the then-current VM-level predicted IOPS rates (step 512). As indicated in the select usage data 464$_1$ from IOPS usage data 264, the VM-level predicted IOPS rates for VMs "vm1" and "vm2" of policy "P1" are both "500". In this case, however, since node "N1" and node "N2" each have only one underlying VM associated with policy "P1", the node-level IOPS apportionments pass through to the VMs without the need for VM-level sharing based on predicted IOPS rates (i.e., since there is only one VM per node, there is no need for VM-level sharing of IOPS). The shown flow concludes by recording the VM-level IOPS apportionments as determined by the intra-node allocation technique 500 (e.g., in IOPS allocation data 352) for access by the nodes (step 514).

In the aforementioned examples, where a particular node hosts merely one underlying VM associated with a particular policy, the predicted IOPS rate of the VM may not affect the VM-level IOPS apportionments. In such cases, the predicted IOPS rate may affect one or more node-level IOPS apportionments. In other cases, such as when a particular node hosts a plurality of underlying VMs associated with a policy, the predicted IOPS rate can influence the VM-level IOPS apportionments.

Further details describing techniques for determining such predicted IOPS rates to facilitate adjustments to the node-level IOPS apportionments and/or the VM-level IOPS apportionments (e.g., step 260 of FIG. 2) are disclosed as follows.

Figure 6:
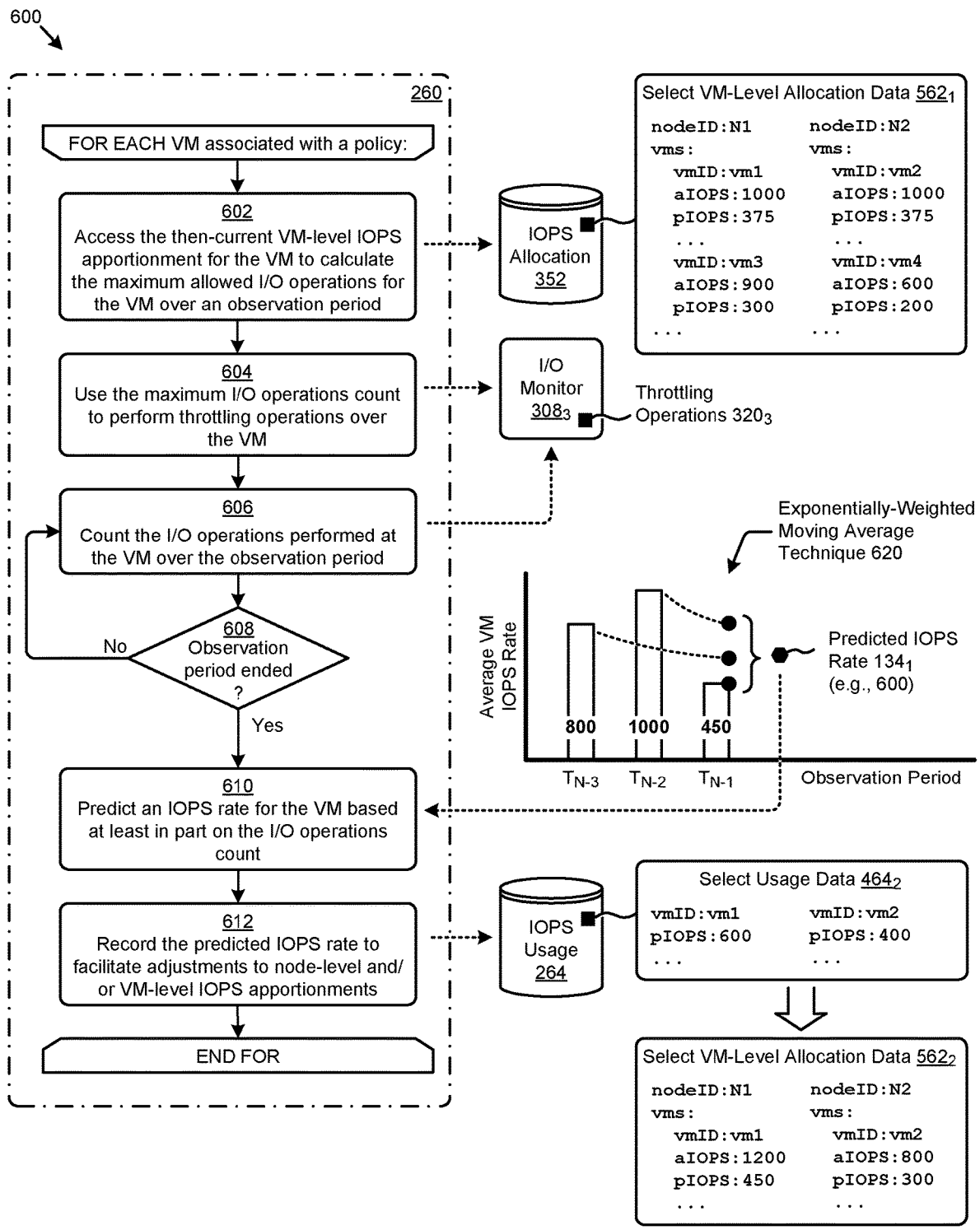
FIG. 6 presents an IOPS allocation adjustment technique as implemented in systems that facilitate multi-stage allocations of IOPS in virtualization environments, according to an embodiment.

FIG. 6 presents an IOPS allocation adjustment technique 600 as implemented in systems that facilitate multi-stage allocations of IOPS in virtualization environments. As an option, one or more variations of IOPS allocation adjustment technique 600 or any aspect thereof may be implemented in the context of the architecture and functionality of the embodiments described herein. The IOPS allocation adjustment technique 600 or any aspect thereof may be implemented in any environment. The shown embodiment depicts operations from step 602 through step 612 together with corresponding data inputs and outputs as one possible partitioning of step 260 of FIG. 2. Other partitioning and other ordering of the operations are possible.

FIG. 6 illustrates one aspect pertaining to implementing a multi-stage allocation mechanism to dynamically apportion policy-based IO limits to virtual machines based on continuous real-time measurements of IO usage. Specifically, the figure is presented to illustrate one embodiment of certain steps and/or operations for monitoring a set of VMs associated with one or more policies to determine a predicted IOPS rate for the VMs. The predicted IOPS rates can then be used to adjust the node-level IOPS apportionments and/or VM-level IOPS apportionments associated with the policies. Certain select data is also shown in the figure to illustrate an example application of the IOPS allocation adjustment technique 600.

For each VM associated with a particular policy to be processed according to the IOPS allocation adjustment technique 600, the then-current VM-level IOPS apportionment of the VM is accessed to calculate the maximum allowed I/O operations for the VM over an observation period (step 602). For example, as shown in the select VM-level allocation data 562₁ from IOPS allocation data 352, the maximum IOPS allowed for VM "vm2" is "1000". If the observation period is, for example, 10 seconds, then VM "vm2" is allowed 10,000 (e.g., 10×1,000) I/O operations in the observation period.

In some cases, the IOPS allocation adjustment technique 600 considers trends and/or blends of inputs when determining IOPS adjustments for a next period. For example, rather than making sudden changes in IOPS apportionments to any VM, an IOPS adjustment might be based on an average between observed usage and predicted usage, or an IOPS adjustment might be based on an average over a plurality of historical observation periods. In still other embodiments, the IOPS allocation adjustment technique 600 may consider the aggregate IOPS usage across all VMs on a node when making predictions and/or when determining IOPS adjustments for a next period.

Such variations in the technique for determining IOPS apportionments can be specified in a policy or other data structure.

The calculated maximum I/O operations count is used to perform certain throttling operations over the VM (step 604). Specifically, if the maximum I/O operations count is exceeded by the count of the I/O operations performed at the VM in a particular observation period (step 606), various throttling operations might be invoked.

In some embodiments, the aforementioned throttling operations might be enforced immediately (e.g., in the current observation period), whereas in other embodiments, enforcement of the aforementioned throttling operations might be suspended for one or more observation periods such that a VM can be periodically permitted to perform I/O "bursts" that temporarily exceed a then-current apportionment up to a statically-defined burst limit or up to a dynamically-calculated specific burst (e.g., up to two times the then-current IOPS apportionment). Such bursts, however, are permitted only infrequently. As such, a running average of IOPS usage for a particular VM is maintained in a stored location that persists over multiple observation periods.

As merely examples, such throttling operations might assign overage charges to additional I/O operations in the period, de-prioritize or suspend I/O operation requests from the VM, and/or carry out other actions. As shown, instances of an I/O monitor 308₃ might perform the throttling operations (e.g., throttling operations 320₃). In any case, the I/O operations performed at the VM will continue to be counted while the end of the then-current observation period has not been reached (see "No" path of decision 608).

When the end of the then-current observation period is reached (see "Yes" path of decision 608), an IOPS rate is predicted for the VM based at least in part on the I/O operations count (step 610). One approach to determining a predicted IOPS rate is to equate it to the average IOPS rate (e.g., the I/O operations count divided by the observation period length in seconds) of the most recently ended observation period. Another approach—as illustrated in an exponentially-weighted moving average technique 620—averages the exponentially weighted average IOPS rates of the most recently ended observation period (e.g., at $T_{N-1}$) and one or more earlier observation periods (e.g., at $T_{N-2}$ and $T_{N-3}$). In the example shown in FIG. 6, a predicted IOPS rate 134₁ of "600" is determined based at least in part on observed IOPS rates of "450", "1000", and "800" over the prior three observation periods. Other techniques and/or approaches to determining predicted IOPS rates are possible.

When the predicted IOPS rate is determined, the predicted IOPS rate is recorded to facilitate adjustments to node-level IOPS apportionments and/or VM-level IOPS apportionments (step 612). As can be observed in the select usage data 464₂, predicted IOPS rates of "600" and "400" are recorded in IOPS usage data 264 for VM "vm1" and VM "vm2", respectively. The instance of select VM-level allocation data 562₂ shown in FIG. 6 indicates the VM-level apportionments for VM "vm1" and VM "vm2" are adjusted (e.g., as compared to select VM-level allocation data 562₁ of FIG. 5) based at least in part on the aforementioned predicted IOPS rates shown in select usage data 464₂ (e.g., as compared to select usage data 464₁ of FIG. 5).

A set of scenarios that depict certain policy-based IOPS limit allocation operations performed in accordance with the herein disclosed techniques are disclosed as follows.

FIG. 7A, FIG. 7B, FIG. 7C, FIG. 7D, FIG. 7E, and FIG. 7F depict IOPS allocation scenarios as performed in systems that facilitate multi-stage allocations of an IOPS limit in virtualization environments. As an option, one or more variations of IOPS allocation scenarios or any aspect thereof may be implemented in the context of the architecture and functionality of the embodiments described herein. The IOPS allocation scenarios or any aspect thereof may be implemented in any environment.

The progression illustrated in the flow of FIG. 7A through FIG. 7F illustrate aspects pertaining to implementing a multi-stage allocation mechanism to dynamically apportion policy-based IO limits to virtual machines based on continuous real-time measurements of IO usage. Specifically, the figures are being presented to illustrate an embodiment of the herein disclosed techniques that facilitate dynamic allocation of the IOPS limits of two policies (e.g., policy "P1" and policy "P2") over multiple nodes, VMs, and observations periods (e.g., observation period $T_N$, observation period $T_{N+1}$, observation period $T_{N+2}$, observation period $T_{N+3}$, and observation period $T_{N+X}$).

Referring to FIG. 7A, an initial allocation of IOPS is made to multiple nodes. In this scenario, the two nodes are allocated respective initial amounts. In an initial allocation period, although the VMs that are assigned to a particular policy are known, their actual demand for IOPS is has not yet been measured. Accordingly, as depicted by start-of-period predicted IOPS rates $762_0$, the prediction is indicated as "0" (i.e., to indicate no prediction is available yet). However, since there are IOPS available to be used, these available IOPS are apportioned based on the node specifications. As shown, node "N1" has its associated node topology data $766_1$ and node "N2" has its associated node topology data $766_2$). Node "N1" is specified to have 60 k IOPS capability and Node "N2" is specified to have 40 k IOPS capability. The total aggregate amount of IOPS as depicted by scenario policy data $760_0$ is 2000 under policy "P1" plus 1500 under policy "P2" for a total of 3500 IOPS limit. Since the node capabilities exhibit a ratio of 60 k/40 k, the total allocation across the nodes for a particular policy is observed for an initial allocation. The provisioned IOPS are split 60/40 as well, since the node capabilities exhibit a ratio of 60 k/40 k.

In this example, the 2000 IOPS under policy "P1" is apportioned to the VMs of policy "P1" in a 60/40 split. This is depicted in FIG. 7A in that the IOPS initially apportioned to VM "vm1" and VM "vm2" are in observance of a 60/40 split (e.g., the 1200/800 split as shown). Also, as depicted in FIG. 7A, the IOPS initially apportioned to VM "vm3" and VM "vm4" are in observance of a 60/40 split (e.g., the 900/600 split as shown). The VMs are run for a time period and observations are taken.

After running the VMs assigned to the two nodes, and after observing how the VMs assigned to those two nodes use IOPS while running, a set of start-of-period predicted IOPS rates are stored (e.g., as a set of scenario policy data), which set of start-of-period predicted IOPS rates is used by an inter-node policy manager and the intra-node policy managers to apportion IOPS for the next time period.

Specifically, and as shown pertaining to observation period ending at $T_N$ of FIG. 7B, a set of scenario policy data $760_1$ and a set of start-of-period predicted IOPS rates $762_1$ are accessed to facilitate the node-level IOPS apportionments and VM-level IOPS apportionments at node "N1" and node "N2" of the aggregate IOPS limits of the policies. The aggregate IOPS limit of "2000" for policy "P1" is apportioned as "1200" to node "N1" and "800" to node "N2" based at least in part on the respective predicted IOPS rates of VM "vm1" and VM "vm2". The aggregate IOPS limit of "1500" for policy "P2" is also apportioned to nodes "N1" and "N2" in accordance with the predicted IOPS rates of VM "vm3" and VM "vm4".

The foregoing depicts an illustrative embodiment that shows and describes how multiple individual policies are applied to different virtual machines running on the same node. In some cases, the individual policies pertain to different virtual machines that belong to different tenants. As such, since individual policies that pertain to different tenants can be individually applied to different VM running on a particular node, this means that specialized nodes (e.g., storage-centric nodes, compute-centric nodes, graphics accelerator nodes, network accelerator nodes, etc.) can be shared by multiple tenants, while still observing the SLAs that correspond to the different tenants.

In alternative embodiments, more (or fewer) calculations are performed in an observation period, and more (or fewer) values are provided to the nodes. Strictly as additional illustrations, the provisioned IOPS might be increased for nodes that are observed to be performing more IOPS than other nodes under management. On the other hand, if all nodes under management are observed to be using substantially the same number of IOPS in one or more observation periods, then the provisioned IOPS for all of the VMs on the same node belonging to a policy is summed up, and that sum, along with measured/predicted IOPS, are used to determine the reapportionment for the next period.

At a later moment in time, an additional VM might be assigned under policy "P1". This is illustrated in the scenario policy data $760_2$ of FIG. 7C. Specifically, the scenario policy data $760_2$ depicts a new VM (e.g., VM "vm5") that is associated with policy "P1". As such, the new VM is added at the start of observation period $T_{N+1}$. Since VM "vm5" is newly instantiated, no predicted IOPS rate for VM "vm5" is available. This is indicated by "vm5: 0" in the example data of the start-of-period predicted IOPS rates $762_2$.

In some embodiments, the node-level and VM-level IOPS apportionments associated with policy "P1" may be determined based at least in part on a minimum IOPS rate (e.g., for VM "vm5"), which minimum is derived from the provisioned IOPS limit of policy "P1". In such a case, the provisioned IOPS limit of "750" of policy "P1" indicates a minimum of 250 IOPS are to be provisioned to any one of three VMs associated with the policy. Some embodiments use one or more proxy values for predicted IOPS. For example, the aforementioned 250 IOPS can serve as a proxy for the predicted IOPS rate of VM "vm5".

In the observation period $T_{N+2}$ of FIG. 7D, the scenario policy data $760_2$ is unchanged as compared to the scenario policy data of observation period $T_{N+1}$, but an updated set of start-of-period predicted IOPS rates $762_3$ are available as a result of observations taken during the observation time period ending at $T_{N+1}$. Thus, the updated predicted IOPS rates are accessed to determine node-level IOPS apportionments and VM-level apportionments of the aggregate IOPS limits. As can be observed, the apportionments associated with policy "P1" are adjusted to accommodate the measured IOPS demanded by a particular VM (e.g., "vm5: 400", as shown).

In some cases, a VM associated with a policy might become unavailable or starved for various reasons (e.g., failure, suspension, etc.). As illustrated in observation period $T_{N+3}$ of FIG. 7E, VM "vm3" at node "N1" has stopped or finished or is otherwise observed as not running or not available. Accordingly, the start-of-period predicted IOPS rates 762₄ indicate the unavailable VM (e.g., VM "vm3") has a low predicted IOPS rate (e.g., predicted IOPS rate of "0", as shown). The status of VM "vm5" might also be accessed from other data sources (e.g., node topology data) as earlier described. Based at least in part on the foregoing predicted IOPS rate, the VM status and/or other information, the aggregate IOPS limit for policy "P2" is allocated entirely to node "N2" and VM "vm4" as shown. However, after the end of the current observation period, variations in actual usage might cause reapportionment ahead of the next observation period. In this particular scenario, the IOPS demands from the VMs under policy "P1" are unchanged from the previous observation period.

Figures 7E, 7F:
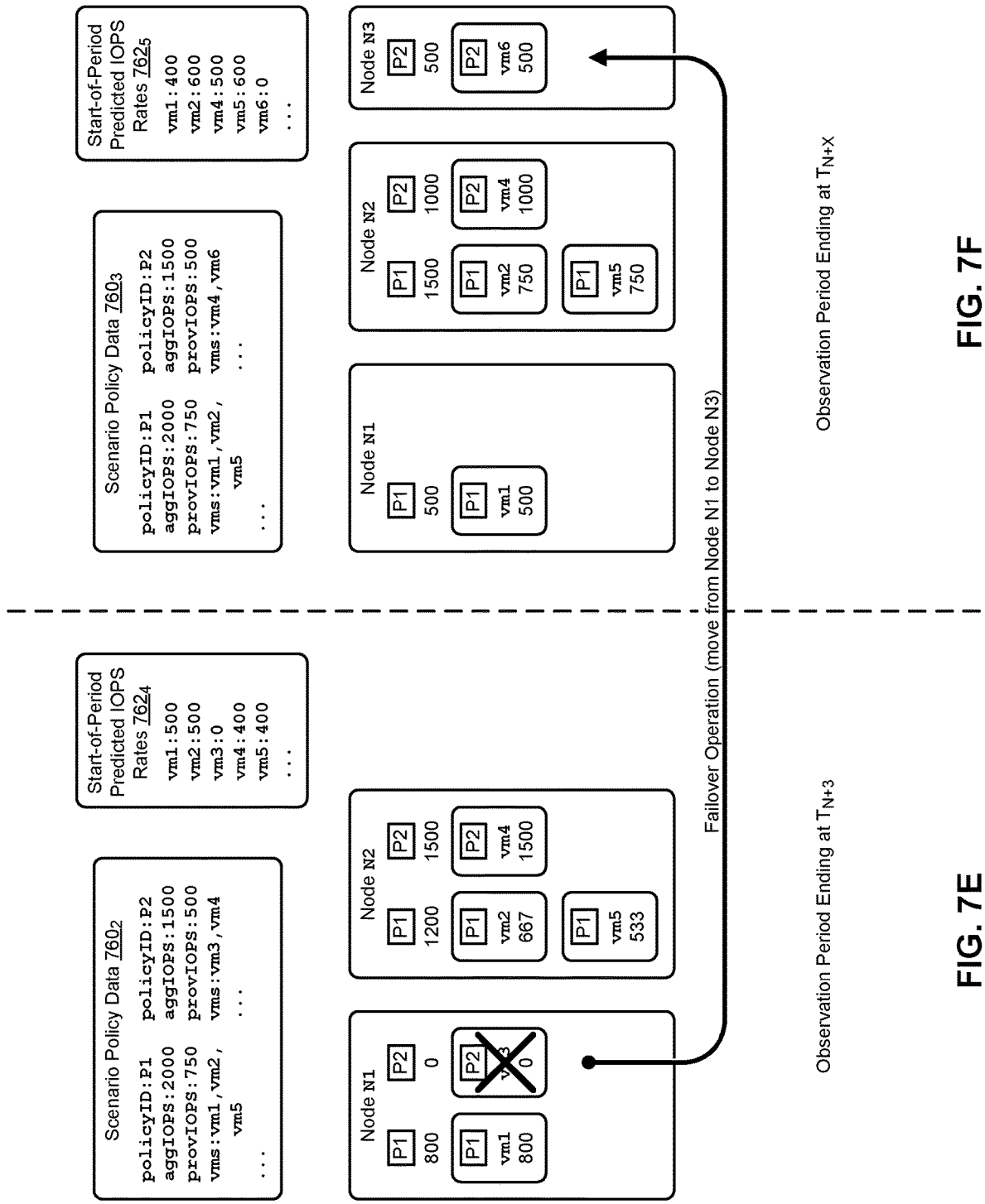

Referring to observation period $T_{N+X}$ of FIG. 7F, consider the case that the earlier described VM "vm3" unavailability was the result of starvation or the result of a failure event, which event in turn triggered failover operations to move the starved or failed VM "vm3" to a newly instantiated VM "vm6" at a node "N3". Now, the scenario policy data 760₃ shows the VM "vm6" in the list of VMs associated with policy "P2", and the start-of-period predicted IOPS rates 762₅ includes the predicted IOPS rate (e.g., "0") of VM "vm6". The foregoing discussion, in particular the discussion of the scenario where starvation can cause migration operations to be performed over a virtual machine is an illustration of how apportionment and re-apportionment of IOPS to virtual machines can result in movement of a virtual machine to avoid starvation. In some starvation cases, the starvation might result from hardware-oriented mis-configuration. In the foregoing example, the workload corresponding to VM "vm3" might have needed more network bandwidth than was available at node "N1", resulting in the starvation. The node "N3" used in the shown remediation might have been selected specifically because it is configured with more and/or faster network I/O ports. As can be seen from the foregoing, the starvation might have been detected because the actual IOPS usage of VM "vm3" was observed to be significantly less than the quantity of IOPS that was allocated to VM "vm3" at the end of the previous observation period. When the migration is complete, the start-of-period predicted IOPS rates for VM "vm6" (i.e., the replacement for the stalled VM "vm3") is initialized (e.g., to '0') and then newly-deployed node and the newly-deployed VM are subjected to ongoing measurement. This is shown by the values for the start-of-period predicted IOPS rates 762₅. Specifically, the start-of-period predicted IOPS rates 762₅ indicates that the predicted IOPS rates of other VMs have changed relative to earlier completed time periods. Since there is no predicted IOPS rate for VM "vm6" (i.e., since it has not yet been observed), the node-level and VM-level IOPS apportionments associated with policy "P2" are determined based at least in part on a minimum IOPS rate for VM "vm6" derived from the provisioned IOPS limit of policy "P2".

One way to apportion at least some IOPS to a VM that has not yet started is to observe the provisioned IOPS limit of the policy. In this scenario, with 500 IOPS being a proxy for the predicted IOPS rate of a new VM, VM "vm6" of node "N3" is apportioned 500 IOPS and VM "vm4" of node "N2" is apportioned "1000" IOPS. Thus, the total IOPS apportioned to the set of then-currently running VMs under policy "P2" equals the aggregate of policy "P2", specifically 1500. The VMs of the system run, are observed over successive time periods, and the IOPS are successively apportioned based on the then-current conditions.

Additional Embodiments of the Disclosure

Additional Practical Application Examples

Figure 8:
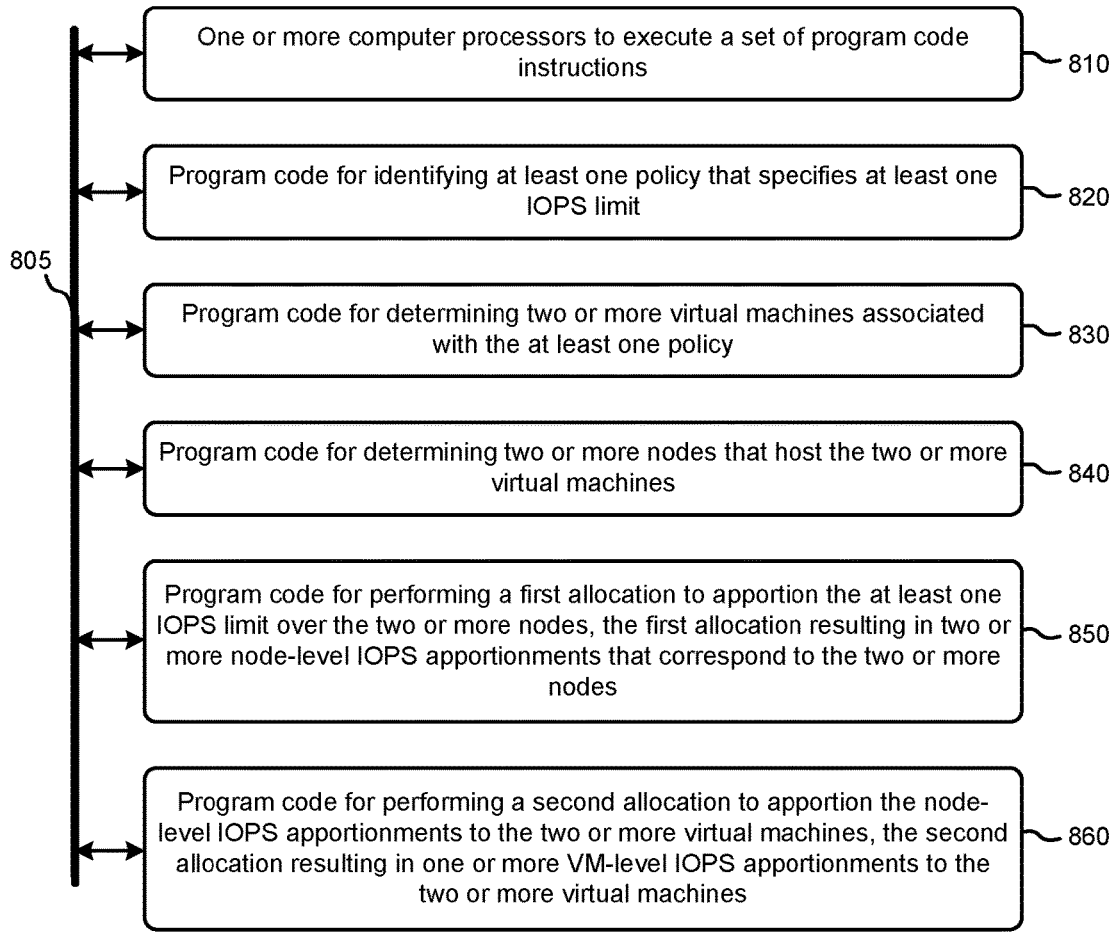
FIG. 8 depicts system components as arrangements of computing modules that are interconnected so as to implement certain of the herein-disclosed embodiments.

FIG. 8 depicts a system 800 as an arrangement of computing modules that are interconnected so as to operate cooperatively to implement certain of the herein-disclosed embodiments. This and other embodiments present particular arrangements of elements that, individually and/or as combined, serve to form improved technological processes that address static allocation of IOPS limits across multiple processes results in starvation of hungry processes even when other processes have unused allocations. The partitioning of system 800 is merely illustrative and other partitions are possible. As an option, the system 800 may be implemented in the context of the architecture and functionality of the embodiments described herein. Of course, however, the system 800 or any operation therein may be carried out in any desired environment.

The system 800 comprises at least one processor and at least one memory, the memory serving to store program instructions corresponding to the operations of the system. As shown, an operation can be implemented in whole or in part using program instructions accessible by a module. The modules are connected to a communication path 805, and any operation can communicate with other operations over communication path 805. The modules of the system can, individually or in combination, perform method operations within system 800. Any operations performed within system 800 may be performed in any order unless as may be specified in the claims.

The shown embodiment implements a portion of a computer system, presented as system 800, comprising one or more computer processors to execute a set of program code instructions (module 810) and modules for accessing memory to hold program code instructions to perform: identifying at least one policy that specifies at least one IOPS limit (module 820); determining two or more virtual machines associated with the at least one policy (module 830); determining two or more nodes that host the two or more virtual machines (module 840); performing a first allocation to apportion the at least one IOPS limit over the two or more nodes, the first allocation resulting in two or more node-level IOPS apportionments that correspond to the two or more nodes (module 850); and performing a second allocation to apportion the node-level IOPS apportionments to the two or more virtual machines, the second allocation resulting in one or more VM-level IOPS apportionments to the two or more virtual machines (module 860).

Variations of the foregoing may include more or fewer of the shown modules. Certain variations may perform more or fewer (or different) steps and/or certain variations may use data elements in more or in fewer (or different) operations. For example, some variations further comprise monitoring and measuring IOPS usage corresponding to the two or more virtual machines, and adjusting either the node-level IOPS apportionments, or the VM-level IOPS apportionments or both based at least in part on the measured IOPS usage. As another example, the at least one policy of the foregoing (module 820) might comprise both a first policy (e.g., for a first tenant) and a second policy (e.g., for a second tenant) that is different in at least one aspect from the first policy. In such cases, when apportioning to VMs on a particular node, the first policy is applied to a first VM running on the particular node and the second policy is applied to a second VM running on the same node.

Still further, some embodiments include variations in the operations performed, and some embodiments include variations of aspects of the data elements used in the operations.

System Architecture Overview

Additional System Architecture Examples

Figure 9A:
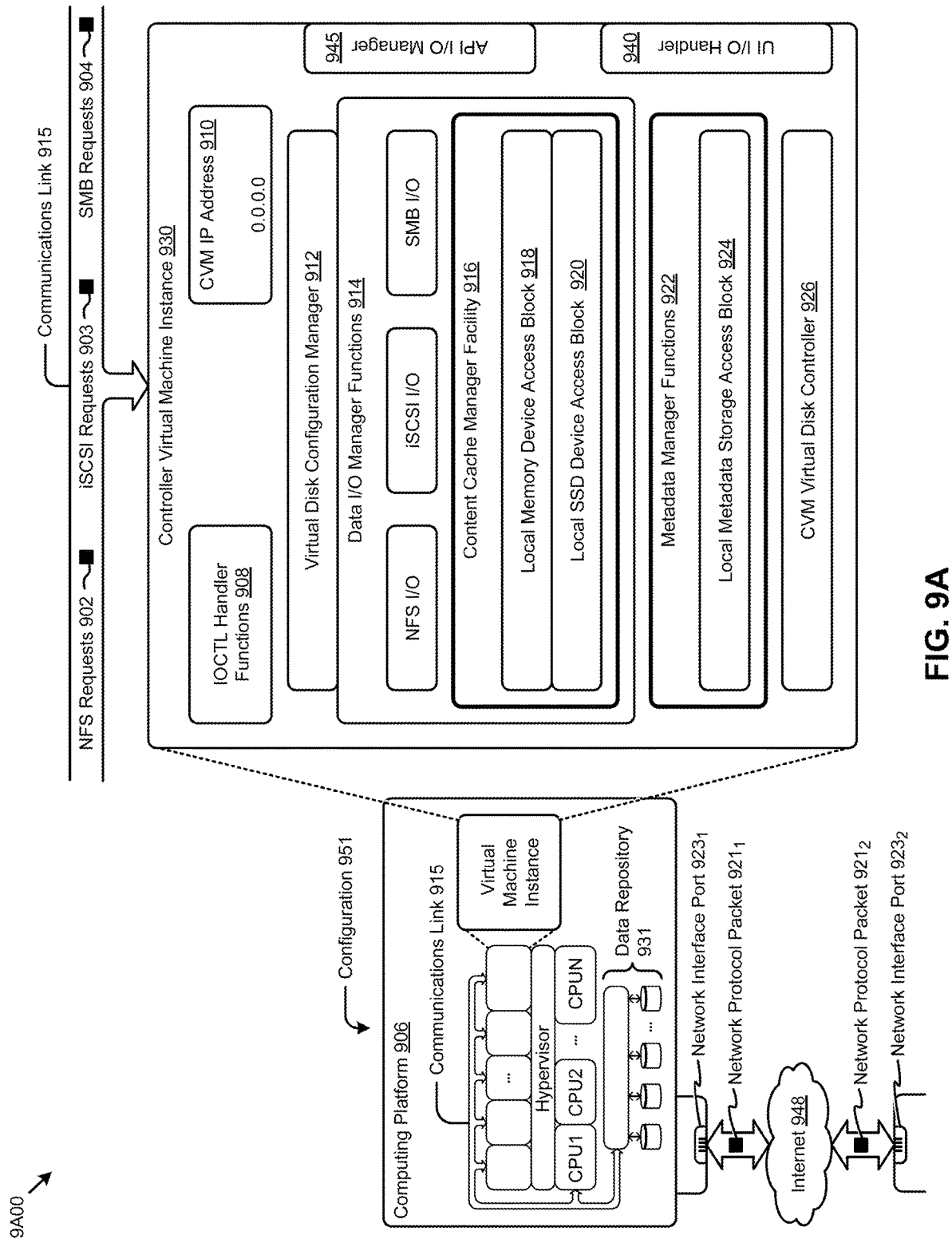
FIG. 9A, FIG. 9B, and FIG. 9C depict virtualized controller architectures comprising collections of interconnected components suitable for implementing embodiments of the present disclosure and/or for use in the herein-described environments.

FIG. 9A depicts a virtualized controller as implemented by the shown virtual machine architecture 9A00. The heretofore-disclosed embodiments, including variations of any virtualized controllers, can be implemented in distributed systems where a plurality of networked-connected devices communicate and coordinate actions using inter-component messaging. Distributed systems are systems of interconnected components that are designed for, or dedicated to, storage operations as well as being designed for, or dedicated to, computing and/or networking operations. Interconnected components in a distributed system can operate cooperatively to achieve a particular objective, such as to provide high performance computing, high performance networking capabilities, and/or high performance storage and/or high capacity storage capabilities. For example, a first set of components of a distributed computing system can coordinate to efficiently use a set of computational or compute resources, while a second set of components of the same distributed storage system can coordinate to efficiently use a set of data storage facilities.

A hyperconverged system coordinates the efficient use of compute and storage resources by and between the components of the distributed system. Adding a hyperconverged unit to a hyperconverged system expands the system in multiple dimensions. As an example, adding a hyperconverged unit to a hyperconverged system can expand the system in the dimension of storage capacity while concurrently expanding the system in the dimension of computing capacity and also in the dimension of networking bandwidth. Components of any of the foregoing distributed systems can comprise physically and/or logically distributed autonomous entities.

Physical and/or logical collections of such autonomous entities can sometimes be referred to as nodes. In some hyperconverged systems, compute and storage resources can be integrated into a unit of a node. Multiple nodes can be interrelated into an array of nodes, which nodes can be grouped into physical groupings (e.g., arrays) and/or into logical groupings or topologies of nodes (e.g., spoke-and-wheel topologies, rings, etc.). Some hyperconverged systems implement certain aspects of virtualization. For example, in a hypervisor-assisted virtualization environment, certain of the autonomous entities of a distributed system can be implemented as virtual machines. As another example, in some virtualization environments, autonomous entities of a distributed system can be implemented as executable containers. In some systems and/or environments, hypervisor-assisted virtualization techniques and operating system virtualization techniques are combined.

As shown, virtual machine architecture 9A00 comprises a collection of interconnected components suitable for implementing embodiments of the present disclosure and/or for use in the herein-described environments. Moreover, virtual machine architecture 9A00 includes a virtual machine instance in configuration 951 that is further described as pertaining to controller virtual machine instance 930. Configuration 951 supports virtual machine instances that are deployed as user virtual machines, or controller virtual machines or both. Such virtual machines interface with a hypervisor (as shown). Some virtual machines include processing of storage I/O (input/output or IO) as received from any or every source within the computing platform. An example implementation of such a virtual machine that processes storage I/O is depicted as 930.

In this and other configurations, a controller virtual machine instance receives block I/O (input/output or IO) storage requests as network file system (NFS) requests in the form of NFS requests 902, and/or internet small computer storage interface (iSCSI) block IO requests in the form of iSCSI requests 903, and/or Samba file system (SMB) requests in the form of SMB requests 904. The controller virtual machine (CVM) instance publishes and responds to an internet protocol (IP) address (e.g., CVM IP address 910). Various forms of input and output (I/O or IO) can be handled by one or more IO control handler functions (e.g., IOCTL handler functions 908) that interface to other functions such as data IO manager functions 914 and/or metadata manager functions 922. As shown, the data IO manager functions can include communication with virtual disk configuration manager 912 and/or can include direct or indirect communication with any of various block IO functions (e.g., NFS IO, iSCSI IO, SMB IO, etc.).

In addition to block IO functions, configuration 951 supports IO of any form (e.g., block IO, streaming IO, packet-based IO, HTTP traffic, etc.) through either or both of a user interface (UI) handler such as UI IO handler 940 and/or through any of a range of application programming interfaces (APIs), possibly through API IO manager 945.

Communications link 915 can be configured to transmit (e.g., send, receive, signal, etc.) any type of communications packets comprising any organization of data items. The data items can comprise a payload data, a destination address (e.g., a destination IP address) and a source address (e.g., a source IP address), and can include various packet processing techniques (e.g., tunneling), encodings (e.g., encryption), and/or formatting of bit fields into fixed-length blocks or into variable length fields used to populate the payload. In some cases, packet characteristics include a version identifier, a packet or payload length, a traffic class, a flow label, etc. In some cases, the payload comprises a data structure that is encoded and/or formatted to fit into byte or word boundaries of the packet.

In some embodiments, hard-wired circuitry may be used in place of, or in combination with, software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to a data processor for execution. Such a medium may take many forms including, but not limited to, non-volatile media and volatile media. Non-volatile media includes any non-volatile storage medium, for example, solid state storage devices (SSDs) or optical or magnetic disks such as hard disk drives (HDDs) or hybrid disk drives, or persistent random access memories (RAPMs) or optical or magnetic media drives such as paper tape or magnetic tape drives. Volatile media includes dynamic memory such as random access memory. As shown, controller virtual machine instance 930 includes content cache manager facility 916 that accesses storage locations, possibly including local dynamic random access memory (DRAM) (e.g., through local memory device access block 918) and/or possibly including accesses to local solid state storage (e.g., through local SSD device access block 920).

Common forms of computer readable media include any non-transitory computer readable medium, for example, floppy disk, flexible disk, hard disk, magnetic tape, or any other magnetic medium; CD-ROM or any other optical medium; punch cards, paper tape, or any other physical medium with patterns of holes; or any RAM, PROM, EPROM, FLASH-EPROM, or any other memory chip or cartridge. Any data can be stored, for example, in any form of data repository 931, which in turn can be formatted into any one or more storage areas, and which can comprise parameterized storage accessible by a key (e.g., a filename, a table name, a block address, an offset address, etc.). Data repository 931 can store any forms of data, and may comprise a storage area dedicated to storage of metadata pertaining to the stored forms of data. In some cases, metadata can be divided into portions. Such portions and/or cache copies can be stored in the external storage data repository and/or in a local storage area (e.g., in local DRAM areas and/or in local SSD areas). Such local storage can be accessed using functions provided by local metadata storage access block 924. Data repository 931 can be configured using CVM virtual disk controller 926, which can in turn manage any number or any configuration of virtual disks.

Execution of the sequences of instructions to practice certain embodiments of the disclosure are performed by one or more instances of a software instruction processor, or a processing element such as a data processor, or such as a central processing unit (e.g., CPU1, CPU2, . . . , CPUN). According to certain embodiments of the disclosure, two or more instances of configuration 951 can be coupled by communications link 915 (e.g., backplane, LAN, PSTN, wired or wireless network, etc.) and each instance may perform respective portions of sequences of instructions as may be required to practice embodiments of the disclosure.

The shown computing platform 906 is interconnected to the Internet 948 through one or more network interface ports (e.g., network interface port 923$_1$ and network interface port 923$_2$). Configuration 951 can be addressed through one or more network interface ports using an IP address. Any operational element within computing platform 906 can perform sending and receiving operations using any of a range of network protocols, possibly including network protocols that send and receive packets (e.g., network protocol packet 921$_1$ and network protocol packet 921$_2$).

Computing platform 906 may transmit and receive messages that can be composed of configuration data and/or any other forms of data and/or instructions organized into a data structure (e.g., communications packets). In some cases, the data structure includes program code instructions (e.g., application code) communicated through the Internet 948 and/or through any one or more instances of communications link 915. Received program code may be processed and/or executed by a CPU as it is received and/or program code may be stored in any volatile or non-volatile storage for later execution. Program code can be transmitted via an upload (e.g., an upload from an access device over the Internet 948 to computing platform 906). Further, program code and/or the results of executing program code can be delivered to a particular user via a download (e.g., a download from computing platform 906 over the Internet 948 to an access device).

Configuration 951 is merely one sample configuration. Other configurations or partitions can include further data processors, and/or multiple communications interfaces, and/or multiple storage devices, etc. within a partition. For example, a partition can bound a multi-core processor (e.g., possibly including embedded or collocated memory), or a partition can bound a computing cluster having a plurality of computing elements, any of which computing elements are connected directly or indirectly to a communications link. A first partition can be configured to communicate to a second partition. A particular first partition and a particular second partition can be congruent (e.g., in a processing element array) or can be different (e.g., comprising disjoint sets of components).

A cluster is often embodied as a collection of computing nodes that can communicate between each other through a local area network (e.g., LAN or virtual LAN (VLAN)) or a backplane. Some clusters are characterized by assignment of a particular set of the aforementioned computing nodes to access a shared storage facility that is also configured to communicate over the local area network or backplane. In many cases, the physical bounds of a cluster are defined by a mechanical structure such as a cabinet or such as a chassis or rack that hosts a finite number of mounted-in computing units. A computing unit in a rack can take on a role as a server, or as a storage unit, or as a networking unit, or any combination therefrom. In some cases, a unit in a rack is dedicated to provisioning of power to other units. In some cases, a unit in a rack is dedicated to environmental conditioning functions such as filtering and movement of air through the rack and/or temperature control for the rack. Racks can be combined to form larger clusters. For example, the LAN of a first rack having a quantity of 32 computing nodes can be interfaced with the LAN of a second rack having 16 nodes to form a two-rack cluster of 48 nodes. The former two LANs can be configured as subnets, or can be configured as one VLAN. Multiple clusters can communicate between one module to another over a WAN (e.g., when geographically distal) or a LAN (e.g., when geographically proximal).

A module as used herein can be implemented using any mix of any portions of memory and any extent of hard-wired circuitry including hard-wired circuitry embodied as a data processor. Some embodiments of a module include one or more special-purpose hardware components (e.g., power control, logic, sensors, transducers, etc.). A data processor can be organized to execute a processing entity that is configured to execute as a single process or configured to execute using multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

Some embodiments of a module include instructions that are stored in a memory for execution so as to facilitate operational and/or performance characteristics pertaining to multi-stage allocation of IOPS limits in virtualization environments. In some embodiments, a module may include one or more state machines and/or combinational logic used to implement or facilitate the operational and/or performance characteristics pertaining to multi-stage allocation of IOPS limits in virtualization environments.

Various implementations of the data repository comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of multi-stage allocation of IOPS limits in virtualization environments). Such files or records can be brought into and/or stored in volatile or non-volatile memory. More specifically, the occurrence and organization of the foregoing files, records, and data structures improve the way that the computer stores and retrieves data in memory, for example, to improve the way data is accessed when the computer is performing operations pertaining to managing multi-stage allocation of IOPS limits in virtualization environments, and/or for improving the way data is manipulated when performing computerized operations pertaining to implementing a multi-stage allocation mechanism to dynamically apportion policy-based IO limits to virtual machines based on continuous real-time measurements of IO usage.

Further details regarding general approaches to managing data repositories are described in U.S. Pat. No. 8,601,473 titled "ARCHITECTURE FOR MANAGING I/O AND STORAGE FOR A VIRTUALIZATION ENVIRONMENT", issued on Dec. 3, 2013, which is hereby incorporated by reference in its entirety.

Further details regarding general approaches to managing and maintaining data in data repositories are described in U.S. Pat. No. 8,549,518 titled "METHOD AND SYSTEM FOR IMPLEMENTING A MAINTENANCE SERVICE FOR MANAGING I/O AND STORAGE FOR A VIRTUALIZATION ENVIRONMENT", issued on Oct. 1, 2013, which is hereby incorporated by reference in its entirety.

Figure 9B:
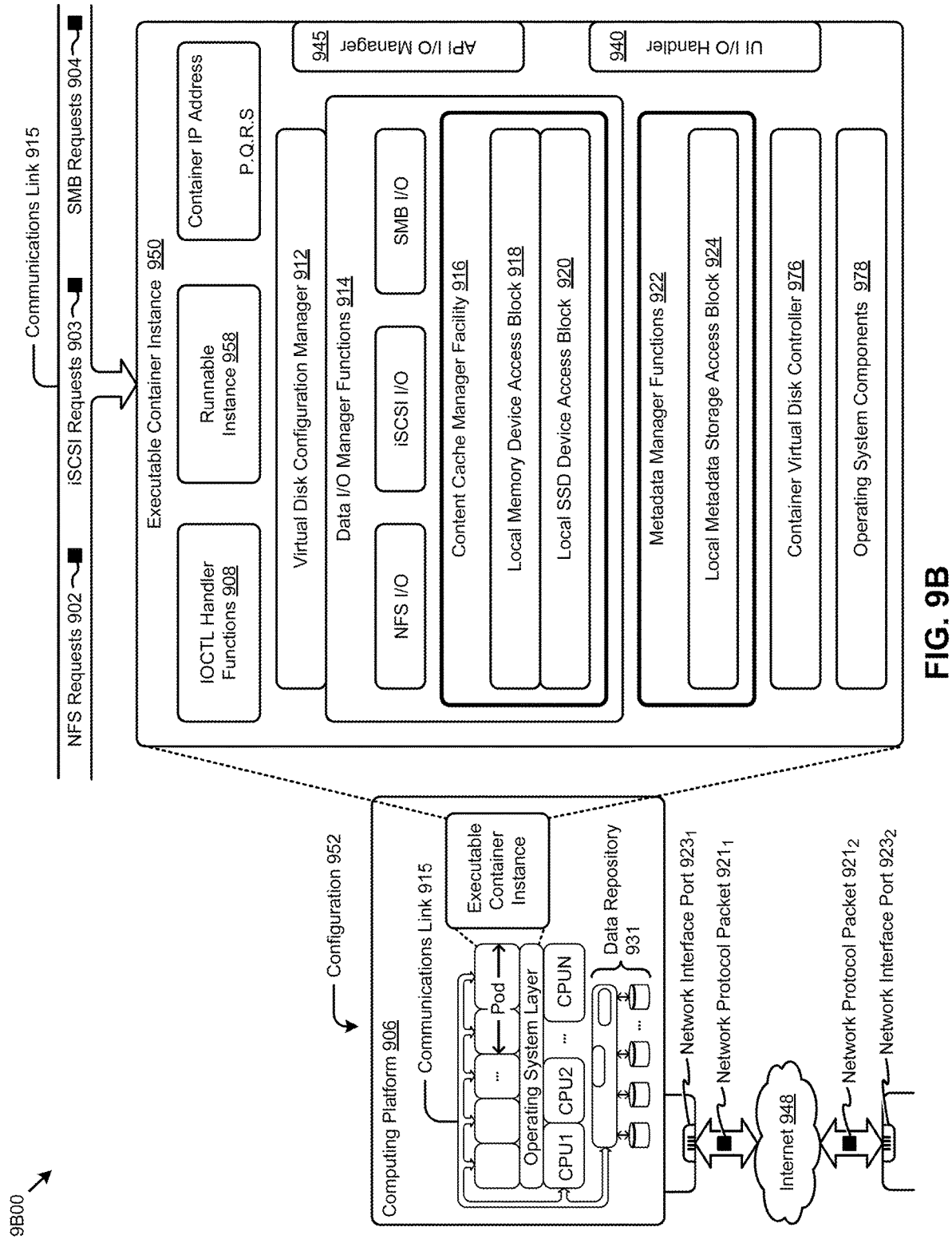

FIG. 9B depicts a virtualized controller implemented by containerized architecture 9B00. The containerized architecture comprises a collection of interconnected components suitable for implementing embodiments of the present disclosure and/or for use in the herein-described environments. Moreover, the shown containerized architecture 9B00 includes an executable container instance in configuration 952 that is further described as pertaining to executable container instance 950. Configuration 952 includes an operating system layer (as shown) that performs addressing functions such as providing access to external requestors via an IP address (e.g., "P. Q. R. S", as shown). Providing access to external requestors can include implementing all or portions of a protocol specification (e.g., "http:") and possibly handling port-specific functions.

The operating system layer can perform port forwarding to any executable container (e.g., executable container instance 950). An executable container instance can be executed by a processor. Runnable portions of an executable container instance sometimes derive from an executable container image, which in turn might include all, or portions of any of, a Java archive repository (JAR) and/or its contents, and/or a script or scripts and/or a directory of scripts, and/or a virtual machine configuration, and may include any dependencies therefrom. In some cases, a configuration within an executable container might include an image comprising a minimum set of runnable code. Contents of larger libraries and/or code or data that would not be accessed during runtime of the executable container instance can be omitted from the larger library to form a smaller library composed of only the code or data that would be accessed during runtime of the executable container instance. In some cases, start-up time for an executable container instance can be much faster than start-up time for a virtual machine instance, at least inasmuch as the executable container image might be much smaller than a respective virtual machine instance. Furthermore, start-up time for an executable container instance can be much faster than start-up time for a virtual machine instance, at least inasmuch as the executable container image might have many fewer code and/or data initialization steps to perform than a respective virtual machine instance.

An executable container instance (e.g., a Docker container instance) can serve as an instance of an application container or as a controller executable container. Any executable container of any sort can be rooted in a directory system, and can be configured to be accessed by file system commands (e.g., "ls" or "ls-a", etc.). The executable container might optionally include operating system components 978, however such a separate set of operating system components need not be provided. As an alternative, an executable container can include runnable instance 958, which is built (e.g., through compilation and linking, or just-in-time compilation, etc.) to include all of the library and OS-like functions needed for execution of the runnable instance. In some cases, a runnable instance can be built with a virtual disk configuration manager, any of a variety of data IO management functions, etc. In some cases, a runnable instance includes code for, and access to, container virtual disk controller 976. Such a container virtual disk controller can perform any of the functions that the aforementioned CVM virtual disk controller 926 can perform, yet such a container virtual disk controller does not rely on a hypervisor or any particular operating system so as to perform its range of functions.

In some environments, multiple executable containers can be collocated and/or can share one or more contexts. For example, multiple executable containers that share access to a virtual disk can be assembled into a pod (e.g., a Kubernetes pod). Pods provide sharing mechanisms (e.g., when multiple executable containers are amalgamated into the scope of a pod) as well as isolation mechanisms (e.g., such that the namespace scope of one pod does not share the namespace scope of another pod).

Figure 9C:
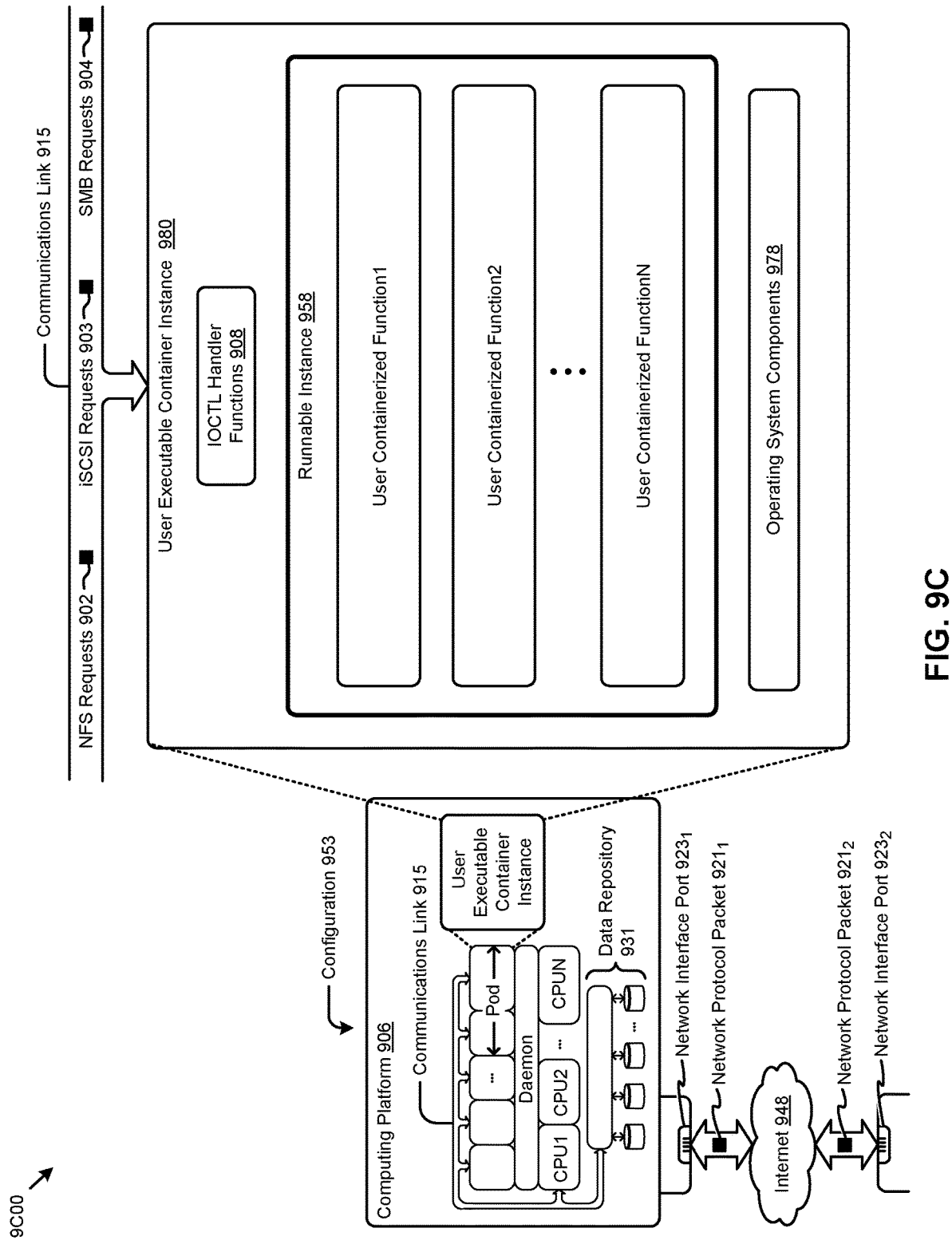

FIG. 9C depicts a virtualized controller implemented by a daemon-assisted containerized architecture 9C00. The containerized architecture comprises a collection of interconnected components suitable for implementing embodiments of the present disclosure and/or for use in the herein-described environments. Moreover, the shown daemon-assisted containerized architecture includes a user executable container instance in configuration 953 that is further described as pertaining to user executable container instance 980. Configuration 953 includes a daemon layer (as shown) that performs certain functions of an operating system.

User executable container instance 980 comprises any number of user containerized functions (e.g., user containerized function1, user containerized function2, . . . , user containerized functionN). Such user containerized functions can execute autonomously, or can be interfaced with or wrapped in a runnable object to create a runnable instance (e.g., runnable instance 958). In some cases, the shown operating system components 978 comprise portions of an operating system, which portions are interfaced with or included in the runnable instance and/or any user containerized functions. In this embodiment of a daemon-assisted containerized architecture, the computing platform 906 might or might not host operating system components other than operating system components 978. More specifically, the shown daemon might or might not host operating system components other than operating system components 978 of user executable container instance 980.

The virtual machine architecture 9A00 of FIG. 9A and/or the containerized architecture 9B00 of FIG. 9B and/or the daemon-assisted containerized architecture 9C00 of FIG. 9C can be used in any combination to implement a distributed platform that contains multiple servers and/or nodes that manage multiple tiers of storage where the tiers of storage might be formed using the shown data repository 931 and/or any forms of network accessible storage. As such, the multiple tiers of storage may include storage that is accessible over communications link 915. Such network accessible storage may include cloud storage or networked storage (e.g., a SAN or "storage area network"). Unlike prior approaches, the presently-discussed embodiments permit local storage that is within or directly attached to the server or node to be managed as part of a storage pool. Such local storage can include any combinations of the aforementioned SSDs and/or HDDs and/or RAPMs and/or hybrid disk drives. The address spaces of a plurality of storage devices, including both local storage (e.g., using node-internal storage devices) and any forms of network-accessible storage, are collected to form a storage pool having a contiguous address space.

Significant performance advantages can be gained by allowing the virtualization system to access and utilize local (e.g., node-internal) storage. This is because I/O performance is typically much faster when performing access to local storage as compared to performing access to networked storage or cloud storage. This faster performance for locally attached storage can be increased even further by using certain types of optimized local storage devices, such as SSDs or RAPMs, or hybrid HDDs or other types of high-performance storage devices.

In example embodiments, each storage controller exports one or more block devices or NFS or iSCSI targets that appear as disks to user virtual machines or user executable containers. These disks are virtual since they are implemented by the software running inside the storage controllers. Thus, to the user virtual machines or user executable containers, the storage controllers appear to be exporting a clustered storage appliance that contains some disks. User data (including operating system components) in the user virtual machines resides on these virtual disks.

Any one or more of the aforementioned virtual disks (or "vDisks") can be structured from any one or more of the storage devices in the storage pool. As used herein, the term vDisk refers to a storage abstraction that is exposed by a controller virtual machine or container to be used by another virtual machine or container. In some embodiments, the vDisk is exposed by operation of a storage protocol such as iSCSI or NFS or SMB. In some embodiments, a vDisk is mountable. In some embodiments, a vDisk is mounted as a virtual storage device.

In example embodiments, some or all of the servers or nodes run virtualization software. Such virtualization software might include a hypervisor (e.g., as shown in configuration 951 of FIG. 9A) to manage the interactions between the underlying hardware and user virtual machines or containers that run client software.

Distinct from user virtual machines or user executable containers, a special controller virtual machine (e.g., as depicted by controller virtual machine instance 930) or as a special controller executable container is used to manage certain storage and I/O activities. Such a special controller virtual machine is referred to as a "CVM", or as a controller executable container, or as a service virtual machine "SVM", or as a service executable container, or as a "storage controller". In some embodiments, multiple storage controllers are hosted by multiple nodes. Such storage controllers coordinate within a computing system to form a computing cluster.

The storage controllers are not formed as part of specific implementations of hypervisors. Instead, the storage controllers run above hypervisors on the various nodes and work together to form a distributed system that manages all of the storage resources, including the locally attached storage, the networked storage, and the cloud storage. In example embodiments, the storage controllers run as special virtual machines—above the hypervisors—thus, the approach of using such special virtual machines can be used and implemented within any virtual machine architecture. Furthermore, the storage controllers can be used in conjunction with any hypervisor from any virtualization vendor and/or implemented using any combinations or variations of the aforementioned executable containers in conjunction with any host operating system components.

In the foregoing specification, the disclosure has been described with reference to specific embodiments thereof. It will however be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A non-transitory computer-readable medium having stored thereon a sequence of instructions which, when executed by a processor, causes a set of acts comprising:
   identifying multiple nodes associated with a policy, the policy specifying an input/output operations per second (IOPS) limit;
   allocating a portion of IOPS of the IOPS limit to each of the multiple nodes, wherein a respective portion of the IOPS allocated to a respective node of the multiple nodes is to be shared across at least one virtualized entity of the respective node, wherein an IOPS usage monitoring function at two or more nodes of the multiple nodes measures node-specific IOPS usage;
   receiving node-specific IOPS usage data for the two or more nodes comprising measured IOPS; and
   reallocating at least a first subset of a first portion of IOPS allocated to a first node of the two or more nodes based on at least the measured IOPS for the first node, wherein the measured IOPS for the first node is different from the portion of IOPS previously allocated to the first node and the first subset is reallocated to a second node.

2. The computer-readable medium of claim 1, wherein the two or more nodes comprises at least the first and second nodes, and reallocation of the first subset to the second node increases a second portion of IOPS allocated to the second node.

3. The computer-readable medium of claim 1, wherein the measured IOPS is used to generate a predicted IOPS rate.

4. The computer-readable medium of claim 3, wherein the predicted IOPS rate is derived from measured IOPS rates over multiple observation periods.

5. The computer-readable medium of claim 1, wherein the set of acts further comprise determining whether a change is to be made to a portion of IOPS to be allocated to the node in response to a change in the policy.

6. The computer-readable medium of claim 5, wherein the change to be made to the portion of IOPS to be allocated to the node is determined based on at least the measured IOPS and the change in the policy.

7. The computer-readable medium of claim 1, wherein the set of acts further comprise throttling one or more I/O operations from respective virtualized entities of a plurality of virtualized entities on respective nodes of the multiple nodes, the throttling being based at least in part on at least the IOPS allocated to a respective node.

8. The computer-readable medium of claim 1, wherein the IOPS limit comprises at least one of, an aggregate IOPS limit, or a provisioned IOPS limit.

9. A method comprising:
identifying multiple nodes associated with a policy, the policy specifying an input/output operations per second (IOPS) limit;
allocating a portion of IOPS of the IOPS limit to each of the multiple nodes, wherein a respective portion of the IOPS allocated to a respective node of the multiple nodes is to be shared across at least one virtualized entity of the respective node, wherein an IOPS usage monitoring function at two or more nodes of the multiple nodes measures node-specific IOPS usage;
receiving node-specific IOPS usage data for the two or more nodes comprising measured IOPS; and
reallocating at least a first subset of a first portion of IOPS allocated to a first node of the two or more nodes based on at least the measured IOPS for the first node, wherein the measured IOPS for the first node is different from the portion of IOPS previously allocated to the first node and the first subset is reallocated to a second node.

10. The method of claim 9, wherein the two or more nodes comprises at least the first and second nodes, and reallocation of the first subset to the second node increases a second portion of IOPS allocated to the second node.

11. The method of claim 9, wherein the measured IOPS is used to generate a predicted IOPS rate.

12. The method of claim 11, wherein the predicted IOPS rate is derived from measured IOPS rates over multiple observation periods.

13. The method of claim 9, further comprising determining whether a change is to be made to a portion of IOPS to be allocated to the node in response to a change in the policy.

14. The method of claim 13, wherein the change to be made to the portion of IOPS to be allocated to the node is determined based on at least the measured IOPS and the change in the policy.

15. The method of claim 9, further comprising throttling one or more I/O operations from respective virtualized entities of a plurality of virtualized entities on respective nodes of the multiple nodes, the throttling being based at least in part on at least the IOPS allocated to a respective node.

16. The method of claim 9, wherein the IOPS limit comprises at least one of, an aggregate IOPS limit, or a provisioned IOPS limit.

17. A system for multi-stage input/output operations (IOPS) allocations, the system comprising:
a storage medium having stored thereon a set of instructions; and
a processor that executes the set of instructions to cause a set of acts, the set of acts comprising:
identifying multiple nodes associated with a policy, the policy specifying an input/output operations per second (IOPS) limit;
allocating a portion of IOPS of the IOPS limit to each of the multiple nodes, wherein a respective portion of the IOPS allocated to a respective node of the multiple nodes is to be shared across at least one virtualized entity of the respective node, wherein an IOPS usage monitoring function at two or more nodes of the multiple nodes measures node-specific IOPS usage;
receiving node-specific IOPS usage data for the two or more nodes comprising measured IOPS; and
reallocating at least a first subset of a first portion of IOPS allocated to a first node of the two or more nodes based on at least the measured IOPS for the first node, wherein the measured IOPS for the first node is different from the portion of IOPS previously allocated to the first node and the first subset is reallocated to a second node.

18. The system of claim 17, wherein the two or more nodes comprises at least the first and second nodes, and reallocation of the first subset to the second node increases a second portion of IOPS allocated to the second node.

19. The system of claim 17, wherein the measured IOPS is used to generate a predicted IOPS rate.

20. The system of claim 19, wherein the predicted IOPS rate is derived from measured IOPS rates over multiple observation periods.

21. The system of claim 17, wherein the set of acts further comprise determining whether a change is to be made to a portion of IOPS to be allocated to the node in response to a change in the policy.

22. The system of claim 21, wherein the change to be made to the portion of IOPS to be allocated to the node is determined based on at least the measured IOPS and the change in the policy.

23. The system of claim 17, wherein the set of acts further comprise throttling one or more I/O operations from respective virtualized entities of a plurality of virtualized entities on respective nodes of the multiple nodes, the throttling being based at least in part on at least the IOPS allocated to a respective node.

24. The system of claim 17, wherein the IOPS limit comprises at least one of, an aggregate IOPS limit, or a provisioned IOPS limit.

* * * * *